United States Patent
Lee et al.

(10) Patent No.: US 11,218,912 B2
(45) Date of Patent: Jan. 4, 2022

(54) METHOD AND APPARATUS FOR CONTROLLING TRAFFIC OF NETWORK DEVICE IN WIRELESS COMMUNICATION NETWORK

(71) Applicant: Samsung Electronics Co., Ltd., Suwon-si (KR)

(72) Inventors: Wonbo Lee, Suwon-si (KR); Youngki Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 35 days.

(21) Appl. No.: 16/957,695

(22) PCT Filed: Dec. 21, 2018

(86) PCT No.: PCT/KR2018/016512
§ 371 (c)(1),
(2) Date: Oct. 13, 2020

(87) PCT Pub. No.: WO2019/132454
PCT Pub. Date: Jul. 4, 2019

(65) Prior Publication Data
US 2021/0099913 A1    Apr. 1, 2021

(30) Foreign Application Priority Data
Dec. 26, 2017 (KR) .................. 10-2017-0179751

(51) Int. Cl.
*H04W 28/12*  (2009.01)
*H04W 28/08*  (2009.01)
(Continued)

(52) U.S. Cl.
CPC ....... *H04W 28/12* (2013.01); *H04W 28/0268* (2013.01); *H04W 28/0273* (2013.01); *H04W 28/0908* (2020.05); *H04W 28/20* (2013.01)

(58) Field of Classification Search
CPC ..... H04W 28/02; H04W 28/10; H04W 28/12; H04W 28/16; H04W 28/20;
(Continued)

(56) References Cited

U.S. PATENT DOCUMENTS 7,990,978 B1    8/2011    Chamas et al.
8,867,642 B1 *  10/2014   Syed .................. H04W 28/065
                                                          375/260
(Continued)

FOREIGN PATENT DOCUMENTS

KR        10-1239526 B1      3/2013
KR     10-2013-0109847 A    10/2013
(Continued)

OTHER PUBLICATIONS

International Search Report dated Apr. 1, 2019 in connection with International Patent Application No. PCT/KR2018/016512, 2 pages.
(Continued)

*Primary Examiner* — Kevin D Mew

(57) ABSTRACT

The present disclosure relates to a communication technique for combining a 5G communication system with IoT technology to support a higher data transmission rate than a 4G system, and a system thereof. The present disclosure can be applied to 5G communication and IoT related technology-based intelligent services (for example, smart homes, smart buildings, smart cities, smart cars or connected cars, health care, digital education, retail business, security and safety related services, etc.). The present invention relates to a method and apparatus for a first network device in a wireless communication network to control traffic of a terminal, and the method of the present invention comprises the steps of: a first network device detecting a first flow in a second network device connected to the first network device after a particular point of time; confirming whether the detected first flow is associated with a first terminal connected to the
(Continued)

second network device after the point of time; and controlling traffic for the flow of the terminal on the basis of the confirmation result.

15 Claims, 19 Drawing Sheets

(51) Int. Cl.
*H04W 28/02* (2009.01)
*H04W 28/20* (2009.01)

(58) Field of Classification Search
CPC ......... H04W 28/0252; H04W 28/0268; H04W 28/0273; H04W 28/09; H04W 28/0908
See application file for complete search history.

(56) References Cited

U.S. PATENT DOCUMENTS

| | | |
|---|---|---|
| 9,577,898 B1 | 2/2017 | Baldi et al. |
| 2003/0179703 A1 | 9/2003 | Levy et al. |
| 2009/0077609 A1* | 3/2009 | Bichot ............ H04N 21/64315 725/127 |
| 2010/0332667 A1 | 12/2010 | Menchaca et al. |
| 2011/0103227 A1 | 5/2011 | Meier et al. |
| 2014/0052838 A1* | 2/2014 | Giacomoni ......... H04L 41/0893 709/223 |
| 2016/0205041 A1 | 7/2016 | Lee et al. |

FOREIGN PATENT DOCUMENTS

| | | |
|---|---|---|
| KR | 10-1353404 B1 | 1/2014 |
| KR | 10-1389446 B1 | 4/2014 |
| KR | 10-2015-0065636 A | 6/2015 |

OTHER PUBLICATIONS

Written Opinion dated Apr. 1, 2019 in connection with International Patent Application No. PCT/KR2018/016512, 3 pages.
Ali Tekeoglu et al., "Approximating the Number of Active Nodes Behind a NAT Device", IEEE, 2011 Proceedings of 20th International Conference on Computer Communications and Networks (ICCCN), Aug. 30, 2011, 7 pages.

* cited by examiner

FIG. 8

| New Flow ID | Checked Dev ID |
|---|---|
| Fn1 | Dev1 → Dev2 → Dev3 |
| Fn2 | Dev2 |
| Fn3 | Dev1 → Dev3 |
| Fn4 | Dev2 → Dev3 |
| ⋮ | ⋮ |

FIG. 10

| Client IP 1 (NAT device) | Dev 1 | |
| --- | --- | --- |
| | Traffic Type (QoS tag) | Flow ID |
| | Qtag1 | F-ID1 |
| | | F-ID3 |
| | Qtag2 | F-ID4 |
| | ⋮ | ⋮ |
| | | |
| | Dev 2 | |
| | Traffic Type (QoS tag) | Flow ID |
| | Qtag3 | F-ID5 |
| | | F-ID6 |
| | Qtag4 | F-ID7 |
| | | F-ID8 |
| | ⋮ | ⋮ |

METHOD AND APPARATUS FOR CONTROLLING TRAFFIC OF NETWORK DEVICE IN WIRELESS COMMUNICATION NETWORK

CROSS-REFERENCE TO RELATED APPLICATIONS

This application is a 371 of International Application No. PCT/KR2018/016512 filed on Dec. 21, 2018, which claims priority to Korean Patent Application No. 10-2017-0179751 filed on Dec. 26, 2017, the disclosures of which are herein incorporated by reference in their entirety.

BACKGROUND

1. Field

The disclosure relates to a wireless communication network and, more particularly, to a method and apparatus for a network device to control traffic of a terminal in a wireless communication network.

2. Description of Related Art

Mobile communication systems have been generally developed to provide voice services while guaranteeing user mobility. Such mobile communication systems have gradually expanded their coverage from voice services through data services up to high-speed data services. However, as current mobile communication systems providing services suffer resource shortages and users demand even higher-speed services, development of more advanced mobile communication systems is needed.

To meet this demand, the 3rd generation partnership project (3GPP) has been working to standardize specifications for the long term evolution (LTE) system as a next generation mobile communication system. LTE is a technology for implementing high-speed packet-based communication with a transmission speed of up to 100 Mbps with the goal of commercialization in about 2010. To this end, various approaches have been considered, such as reducing the number of nodes on a communication path through simplification of the network architecture and bringing wireless protocols as close as possible to wireless channels.

In addition, to meet the ever increasing demand for wireless data traffic since the commercial deployment of 4G communication systems, efforts have been made to develop improved 5G or pre-5G communication systems. As such, 5G or pre-5G communication systems are also called "beyond 4G network" or "post LTE system".

To achieve high data rates, 5G communication systems are being considered for implementation in the extremely high frequency (mmWave) band (e.g., 60 GHz band). To decrease path loss of radio waves and increase the transmission distance in the mmWave band, various technologies including beamforming, massive multiple-input multiple-output (massive MIMO), full dimensional MIMO (FD-MIMO), array antennas, analog beamforming, and large scale antennas are considered for 5G communication systems.

To improve system networks in 5G communication systems, technology development is underway regarding evolved small cells, advanced small cells, cloud radio access networks (cloud RANs), ultra-dense networks, device-to-device (D2D) communication, wireless backhaul, moving networks, cooperative communication, coordinated multi-points (CoMP) communication, reception interference cancellation, and the like.

Additionally, advanced coding and modulation (ACM) schemes such as hybrid FSK and QAM modulation (FQAM) and sliding window superposition coding (SWSC), and advanced access technologies such as filter bank multi carrier (FBMC), non-orthogonal multiple access (NOMA), and sparse code multiple access (SCMA) are also under development for 5G communication systems.

Meanwhile, in a home network, multiple users can use various types of applications such as real-time video/audio, video/audio on demand (VoD/AoD), social media (SNS), web browsing, and file download. In this case, because the service quality requirements (data transfer rate, latency, etc.) are different according to the applications used by each user, if limited network bandwidth resources are equally allocated to all users, the quality of some services may be seriously deteriorated.

For example, the data reception speed in video streaming may directly affect the quality of experience of the user, but simple downloading of a large file is generally processed in the background and the data reception speed may not significantly affect the quality of experience of the user. In this situation, when the same network resource is allocated to the video streaming service and the file download service, video playback quality may be deteriorated.

In the related art, a network device such as a switch or a router directly connected between the Internet and user terminals may detect service applications for each user terminal, and may control the quality of service (QoS) about the traffic for each terminal or control QoS according to traffic types for each flow without discriminating individual terminals.

FIG. 1 illustrates a situation where user terminals are connected to a home gateway via a wired/wireless router.

When a first network device (i.e., home gateway), a second network device (i.e., wired/wireless router) and user terminals are connected as shown in FIG. 1, the first network device may detect only the second network device as one terminal without detecting the user terminals connected to the second network device. In this situation, the user terminals are not directly connected to an internet network, but may be connected to the internet network via the first network device and the second network device (i.e., wired/wireless router) supporting network address translation (NAT) mode.

FIG. 2 illustrates bandwidth allocation when plural terminals request the same service.

When two or more terminals request the same service (second service herein) as shown in FIG. 2, the first network device may recognize the terminals using the service as one device (wired/wireless router) and allocate a service bandwidth corresponding to one device, in which case as the number of terminals using the same service increases, the quality of service of the terminal may deteriorate. When the number of terminals using the same service increases, plural terminals may share the bandwidth corresponding to one terminal, so that the quality for the terminal using the service may be deteriorated.

FIG. 3 illustrates bandwidth allocation when one terminal requests a plurality of services.

As shown in FIG. 3, when a specific user terminal among NAT-connected user terminals simultaneously uses plural applications and generates multiple flows, if the bandwidth is allocated for each flow, as the bandwidth that can be allocated to other users is reduced, a service quality difference may occur between users. This can be a problem especially in public places where equality in service quality is required between users, so discussions are needed to address these issues.

The disclosure has been made in view of the above problems and is to provide a method and apparatus that enable a first network device in a wireless communication network to identify a user terminal connected to a second network device after a specific point in time and control the traffic of the user terminal.

SUMMARY

To solve the above problems, a method for a first network device to control traffic of a terminal in a wireless communication network according to the disclosure may include: detecting a first flow generated after a specific point in time in a second network device connected to the first network device; determining whether the detected first flow is associated with a first terminal connected to the second network device after the specific point in time; and controlling traffic of the terminal based on a result of the determining.

Preferably, the determining whether the detected first flow is associated with a first terminal in the method for the first network device to control traffic may be determining whether the detected first flow corresponds to a flow of the first terminal by using at least one of a timestamp (TS) or an internet protocol identification (IPID).

Preferably, the determining whether the detected first flow corresponds to a flow of the first terminal by using the timestamp in the method for the first network device to control traffic may be: configuring a time window based on a packet generated in the first flow; comparing, in the time window, a timestamp value of a packet generated in a second flow created before the specific point in time with a timestamp value of the packet generated in the first flow; determining that a terminal of the second flow and a terminal of the first flow are different in case that a result of the comparing exceeds a predetermined value; and determining that the detected first flow is a flow of the first terminal in case that terminals of all the second flows of the second network device are different from the terminal of the first flow or same terminal is not identified until a given time elapses after detection of the first flow.

Preferably, the determining whether the detected first flow corresponds to a flow of the first terminal by using an IPID in the method for the first network device to control traffic may be: configuring an IPID window based on a packet generated in the first flow; comparing, in the IPID window, an IPID value of a packet generated in a second flow created before the specific point in time with an IPID value of the packet generated in the first flow; determining that a terminal of the second flow and a terminal of the first flow are different in case that a result of the comparing exceeds a predetermined value; and determining that the detected first flow is a flow of the first terminal in case that terminals of all the second flows of the second network device are different from the terminal of the first flow or same terminal is not identified until a given time elapses after detection of the first flow.

Preferably, the controlling traffic of the terminal in the method for the first network device to control traffic may be configuring the quality of service (QoS) for at least one terminal connected to the second network device.

Preferably, the configuring QoS in the method for the first network device to control traffic may be adjusting a bandwidth for at least one terminal connected to the second network device.

In addition, a first network device for controlling traffic of a terminal in a wireless communication network according to the disclosure may include: a transceiver configured to transmit and receive signals; and a controller configured to detect a first flow generated after a specific point in time in a second network device connected to the first network device, determine whether the detected first flow is associated with a first terminal connected to the second network device after the specific point in time, and control traffic of the terminal based on a result of the determining.

Preferably, the controller of the first network device for controlling traffic of a terminal may further include a terminal detector that is configured to determine whether the detected first flow corresponds to a flow of the first terminal by using at least one of a timestamp (TS) or an internet protocol identification (IPID).

Preferably, the terminal detector of the first network device for controlling traffic of a terminal may be configured to configure a time window based on a packet generated in the first flow, compare, in the time window, a timestamp value of a packet generated in a second flow created before the specific point in time with a timestamp value of the packet generated in the first flow, determine that a terminal of the second flow and a terminal of the first flow are different in case that a result of the comparing exceeds a predetermined value, and determine that the detected first flow is a flow of the first terminal in case that terminals of all the second flows of the second network device are different from the terminal of the first flow or same terminal is not identified until a given time elapses after detection of the first flow.

Preferably, the terminal detector of the first network device for controlling traffic of a terminal may be configured to configure an IPID window based on a packet generated in the first flow, compare, in the IPID window, an IPID value of a packet generated in a second flow created before the specific point in time with an IPID value of the packet generated in the first flow, determine that a terminal of the second flow and a terminal of the first flow are different in case that a result of the comparing exceeds a predetermined value, and determine that the detected first flow is a flow of the first terminal in case that terminals of all the second flows of the second network device are different from the terminal of the first flow or same terminal is not identified until a given time elapses after detection of the first flow.

Preferably, the controller of the first network device for controlling traffic of a terminal may further include a traffic manager that is configured to configure the quality of service (QoS) for at least one terminal connected to the second network device.

Preferably, the traffic manager of the first network device for controlling traffic of a terminal may be configured to adjust a bandwidth for at least one terminal connected to the second network device.

According to the disclosure, the first network device may identify a terminal associated with a traffic flow generated in the second network device and control traffic for the flow of the identified terminal.

BRIEF DESCRIPTION OF THE DRAWINGS

FIG. 8 is a table showing an example of a new flow list according to an embodiment of the disclosure.

FIG. 10 is a table showing an example of a device list according to an embodiment of the disclosure.

DETAILED DESCRIPTION

Figure 1:
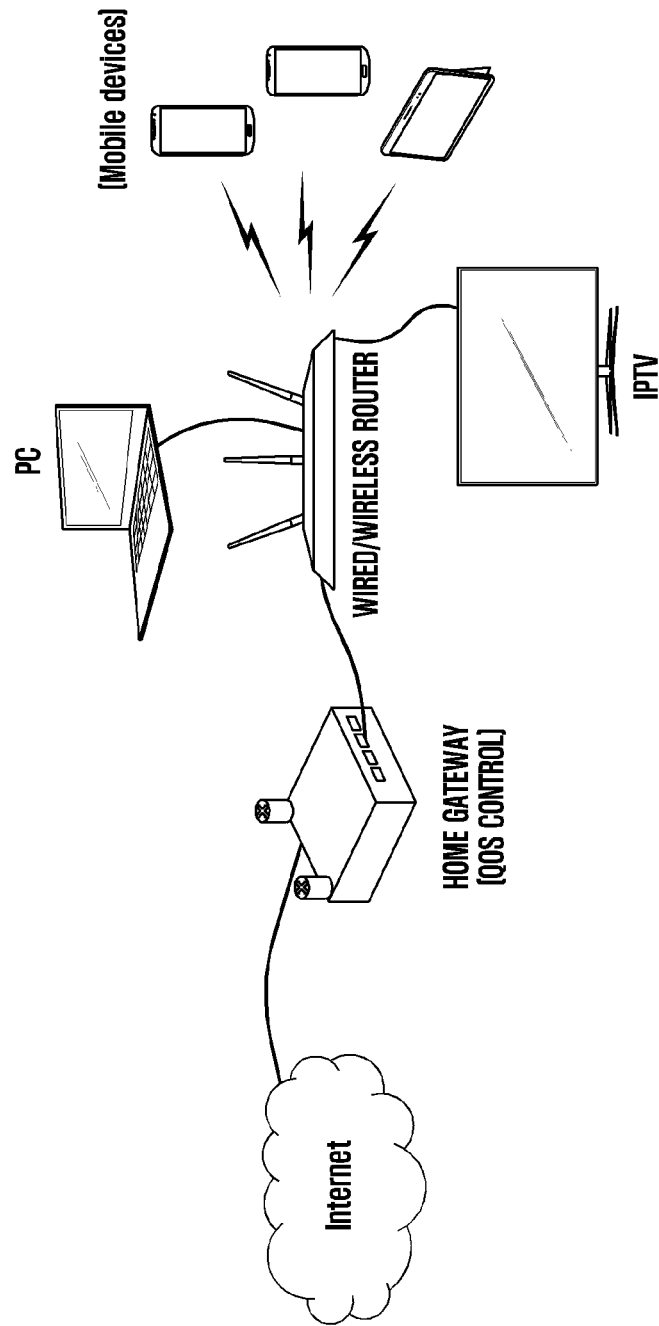
FIG. 1 illustrates a situation where user terminals are connected to a home gateway via a wired/wireless router.

In the following description of embodiments of the disclosure, descriptions of technical details well known in the art and not directly related to the disclosure may be omitted. This is to more clearly convey the gist of the disclosure without obscurities by omitting unnecessary descriptions.

Likewise, in the drawings, some elements are exaggerated, omitted, or only outlined in brief. Also, the size of each element does not necessarily reflect the actual size. The same or similar reference symbols are used throughout the drawings to refer to the same or like parts.

Advantages and features of the disclosure and methods for achieving them will be apparent from the following detailed description of embodiments taken in conjunction with the accompanying drawings. However, the disclosure is not limited to the embodiments disclosed below but may be implemented in various different ways, the embodiments are provided only to complete the disclosure and to fully inform the scope of the disclosure to those skilled in the art to which the disclosure pertains, and the disclosure is defined only by the scope of the claims. The same reference symbols are used throughout the description to refer to the same parts.

Meanwhile, it will be appreciated that blocks of a flowchart and a combination of flowcharts may be executed by computer program instructions. These computer program instructions may be loaded on a processor of a general purpose computer, special purpose computer, or programmable data processing equipment, and the instructions executed by the processor of a computer or programmable data processing equipment create a means for carrying out functions described in blocks of the flowchart. To implement the functionality in a certain way, the computer program instructions may also be stored in a computer usable or readable memory that is applicable in a specialized computer or a programmable data processing equipment, and it is possible for the computer program instructions stored in a computer usable or readable memory to produce articles of manufacture that contain a means for carrying out functions described in blocks of the flowchart. As the computer program instructions may be loaded on a computer or a programmable data processing equipment, when the computer program instructions are executed as processes having a series of operations on a computer or a programmable data processing equipment, they may provide steps for executing functions described in blocks of the flowchart.

Each block of a flowchart may correspond to a module, a segment or a code containing one or more executable instructions for executing one or more logical functions, or to a part thereof. It should also be noted that functions described by blocks may be executed in an order different from the listed order in some alternative cases. For example, two blocks listed in sequence may be executed substantially at the same time or executed in reverse order according to the corresponding functionality.

Here, the word "unit", "module", or the like used in the embodiments may refer to a software component or a hardware component such as an FPGA or ASIC capable of carrying out a function or an operation. However, "unit" or the like is not limited to hardware or software. A unit or the like may be configured so as to reside in an addressable storage medium or to drive one or more processors. For example, units or the like may refer to components such as a software component, object-oriented software component, class component or task component, processes, functions, attributes, procedures, subroutines, program code segments, drivers, firmware, microcode, circuits, data, databases, data structures, tables, arrays, or variables. A function provided by a component and unit may be a combination of smaller components and units, and it may be combined with others to compose larger components and units. Components and units may be implemented to drive one or more processors in a device or a secure multimedia card.

Next, a description is given of a method in which a first network device in a wireless communication network detects a flow generated after a specific point in time in a second network device connected to the first network device and checks whether the flow is associated with a terminal connected to the second network device after the specific point in time so as to control the traffic of the terminal. In this case, the first network device can manage traffic by guaranteeing a minimum bandwidth to the terminal and limiting a maximum bandwidth.

In the following description, a new terminal may indicate a terminal connected to the second network device after a specific point in time. Specifically, the new terminal may indicate a terminal connected to the second network device while the first network device is managing traffic of other terminals. The specific point in time may vary according to the situation where the first network device manages traffic. The new terminal may be referred to as a first terminal.

On the other hand, an existing terminal may indicate a terminal already connected to the second network device from before the specific point in time. Specifically, the existing terminal may indicate a terminal whose traffic is being managed by the first network device. The existing terminal may be referred to as a second terminal.

Also, a new flow may indicate a flow generated after a specific point in time. Specifically, the new flow may indicate a flow generated while the first network device is managing traffic of terminals. The new flow may be generated to provide a service to the new terminal or to provide a new service to the existing terminal. The new flow may be referred to as a first flow.

On the other hand, an existing flow may indicate a flow that is generated before the specific point in time and is being managed by the first network device. The existing flow may be referred to as a second flow.

Additionally, a description will be given of the first network device of the disclosure that checks whether a new terminal is connected to the second network device for controlling the traffic as separate embodiments.

The disclosure relates to a traffic control method for the first network device, and the method of checking whether a new terminal is connected and the method of controlling the traffic for the flow of the new terminal are not limited to the following embodiments and may be carried out in various ways.

In the description, traffic control may mean that the home gateway connected to an internet network restricts traffic or gives priority to specific traffic to ensure proper quality of a service. Recently, as the amount of data required increases in response to an increase in the use of services inducing large-volume traffic such as streaming video and P2P file sharing, traffic control may be required to cope with capacity shortage caused by traffic explosion.

QoS configuration may mean that a network device tags a QoS tag to a specific traffic flow and sets QoS-related parameters such as network bandwidth and delay time according to the QoS tag so as to guarantee the service quality. The network device may perform operations such as guaranteeing a transmission speed of a specific service, or conversely, restricting the service from using more than a certain bandwidth.

In an environment as shown in FIG. 1, the first network device may perform traffic control by configuring QoS based on the number of user terminals connected to the second network device and traffic types.

Thereafter, the first network device may monitor transmission/reception data traffic of the terminals connected to the second network device and detect a specific service in the flows of the terminals. The first network device can identify whether a first flow is generated after a specific point in time through the monitoring and detection process, and may identify whether a new terminal is connected by comparing the first flow with a second flow generated before the specific point in time. Then, the first network device may control traffic for service flows based on the check result, and the control method may include updating settings such as network bandwidth and delay time.

Figure 2:
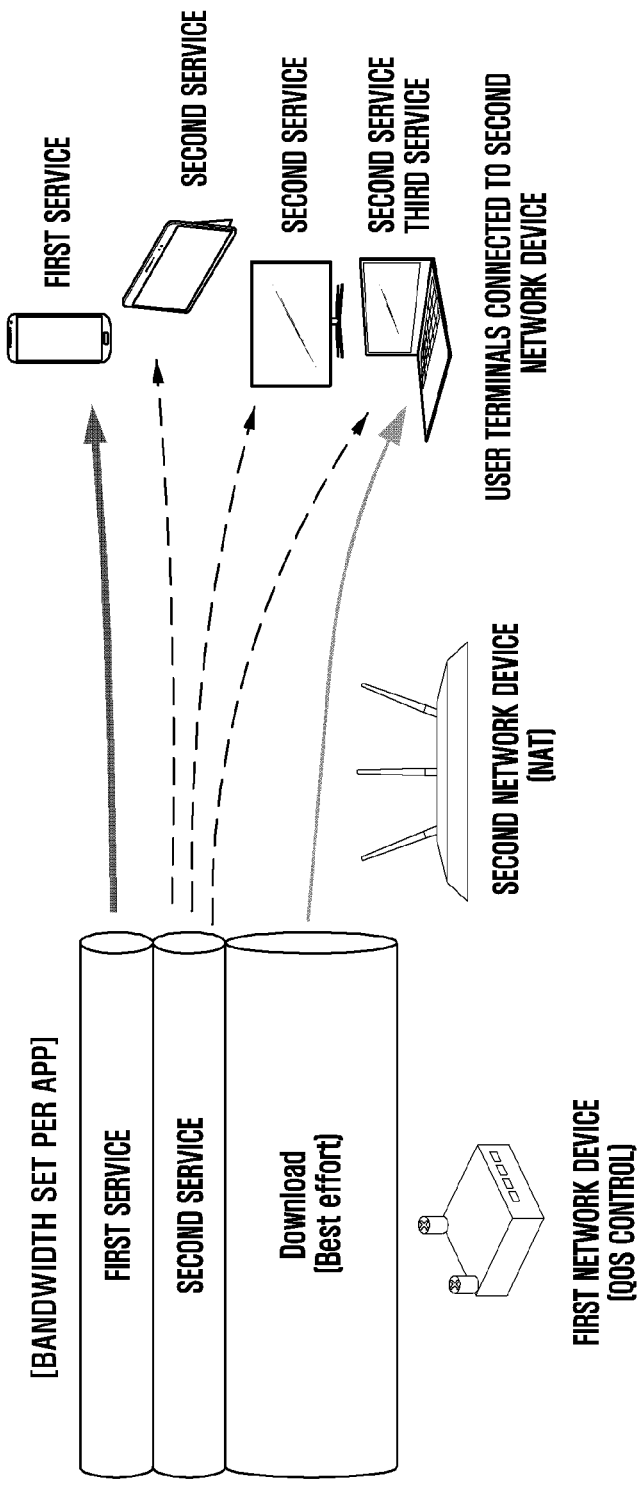
FIG. 2 illustrates bandwidth allocation when plural terminals request the same service.

For example, in the case of FIG. 2 where there are three users of the second service, the first network device may allocate three times the existing bandwidth to the second service or allocate a specified bandwidth to individual flows of the user terminals, so that it can satisfy QoS for all user terminals in the second network device.

Figure 3:
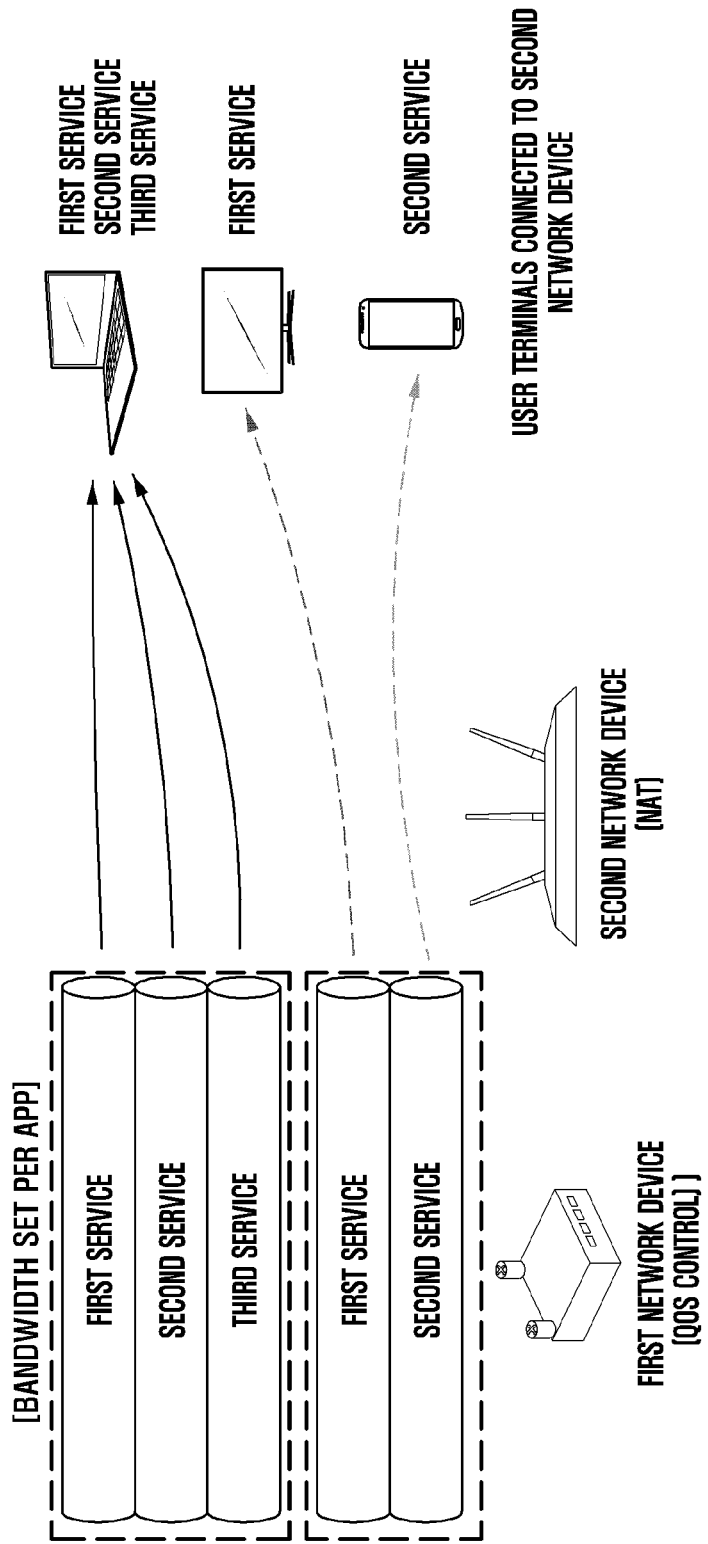
FIG. 3 illustrates bandwidth allocation when one terminal requests a plurality of services.

Additionally, in the case of FIG. 3, the first network device may identify flows generated by a specific user terminal among the plural flows occurring in the second network device. Then, the first network device may limit the total available bandwidth for the specific terminal to thereby allocate the equal bandwidth to individual user terminals in the second network device.

Figure 4:
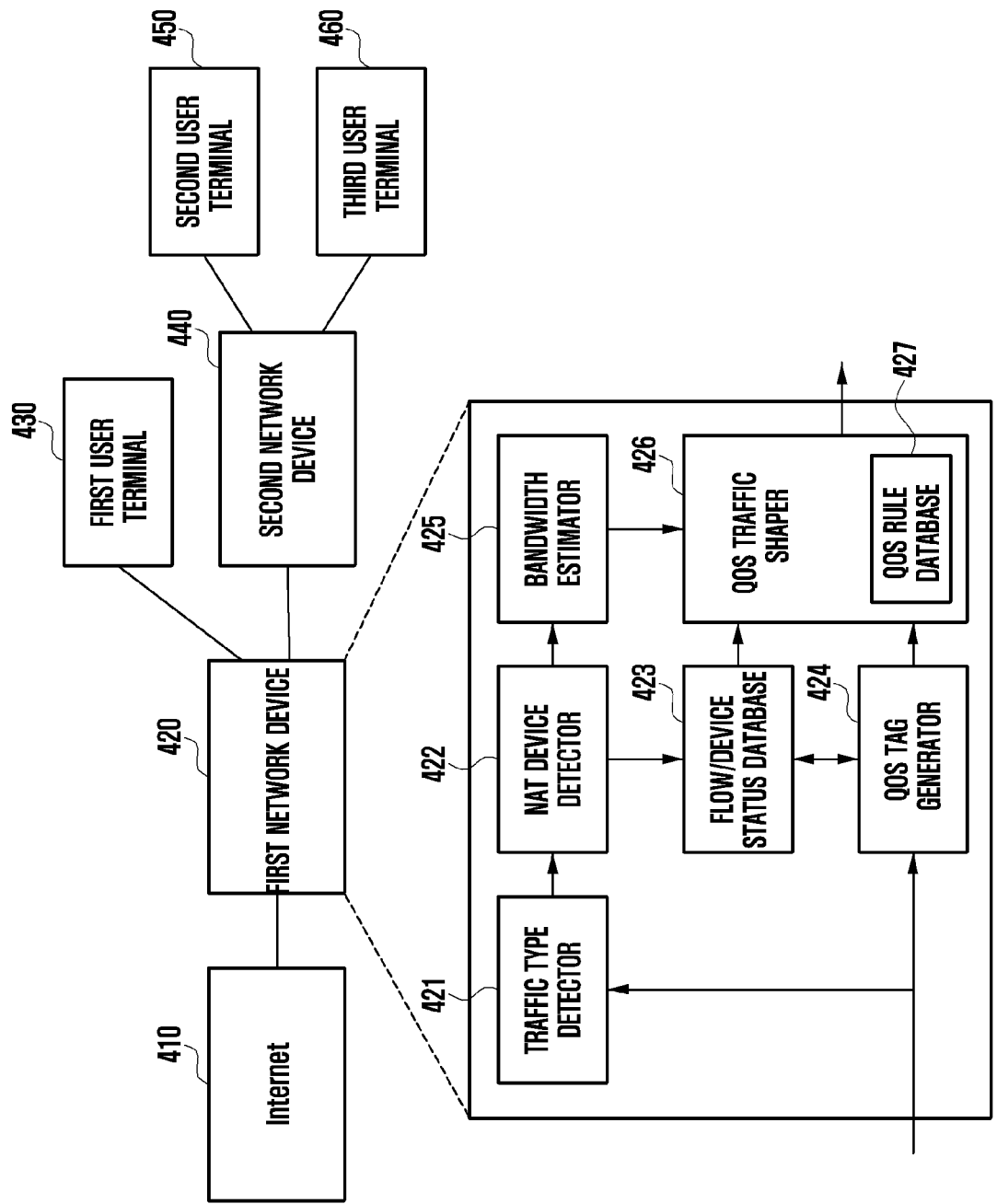
FIG. 4 illustrates the connection between an internet network, network devices, and terminals in a network.

FIG. 4 illustrates the connection between an internet network 410, network devices, and terminals in a network.

The internet network 410 may be connected through a first network device 420 such as a home gateway, a consumer premises equipment (CPE), or the like. A second network device 440 such as a wired/wireless router may be connected to the first network device 420. A first user terminal 430 and the second network device 440 may be connected to the internet network 410 through the first network device 420, and a second user terminal 450 and a third user terminal 460 may be connected to the internet network 410 through the second network device 440 performing a network address translation (NAT) function. The first user terminal 430, the second user terminal 450, and the third user terminal 460 may indicate a user terminal on which an Internet service application is installed, such as a PC, a laptop, an IPTV, or a smartphone. The user terminals may request a service, and the service may be provided through a flow.

The first network device 420 may include a traffic type detector 421, a NAT device detector 422, a flow status database 423, a QoS tag generator 424, a bandwidth estimator 425, a QoS traffic shaper 426, and a QoS rule database 427. These components are not essential elements of the first network device 420 and may be omitted. As the above components represent functions of the first network device 420, they may not necessarily be physically implemented.

When a new flow passing through the first network device 420 is generated after a specific point in time, the traffic type detector 421 may identify the traffic type based on packets of the new flow. The traffic type detector 421 may identify the traffic type based on 5-tuple (source IP, destination IP, source port, destination port, protocol) information in the header of a packet of the flow.

The traffic type may be identified by an application (app) or may be identified by service type such as video on demand, real-time streaming, audio, game, or web. Additionally, the traffic type may be identified by using IP addresses, port information, payload data information, and traffic pattern, or by using a general deep packet inspection (DPI) tool.

When a new flow (flow2) is generated in the third user terminal 460 while a flow (flow1) has been generated in the second user terminal 450, the NAT device detector 422 may determine whether the flow (flow1) and the new flow (flow2) are flows for providing a service to the same terminal. For this determination, the NAT device detector 422 may compare the IP header, TCP header, and payload data of a packet in the flow (flow1) with those of a packet in the new flow (flow2).

Upon determining that the flows are flows of different terminals, the IP or MAC address of the terminal may be registered in the second network device 440, and information on the second and third user terminals and information on flow1 and flow2 may be recorded in the flow/device status database 423. As the NAT device detector 422 can identify the number of active terminals connected to the second network device 440, the first network device 420 can perform traffic control such as guaranteeing a minimum bandwidth and limiting the maximum bandwidth for each user terminal.

The flow/device status database 423 may also store a flow list, a device list, and new flow status information.

The QoS tag generator 424 may generate a new QoS tag based on whether a new flow is generated in an existing terminal and traffic type information. The QoS tag may be updated on the flow list.

The bandwidth estimator 425 may measure or estimate the available network bandwidth of the first network device 420 toward the internet network 410.

In addition, the QoS traffic shaper 426 may update the QoS rule database 427 for each QoS tag and control the traffic according to the QoS rule for the QoS tag of each flow packet based on the available bandwidth of the first network device 420, whether a new flow is generated in an existing terminal, and traffic type information.

Figure 5:
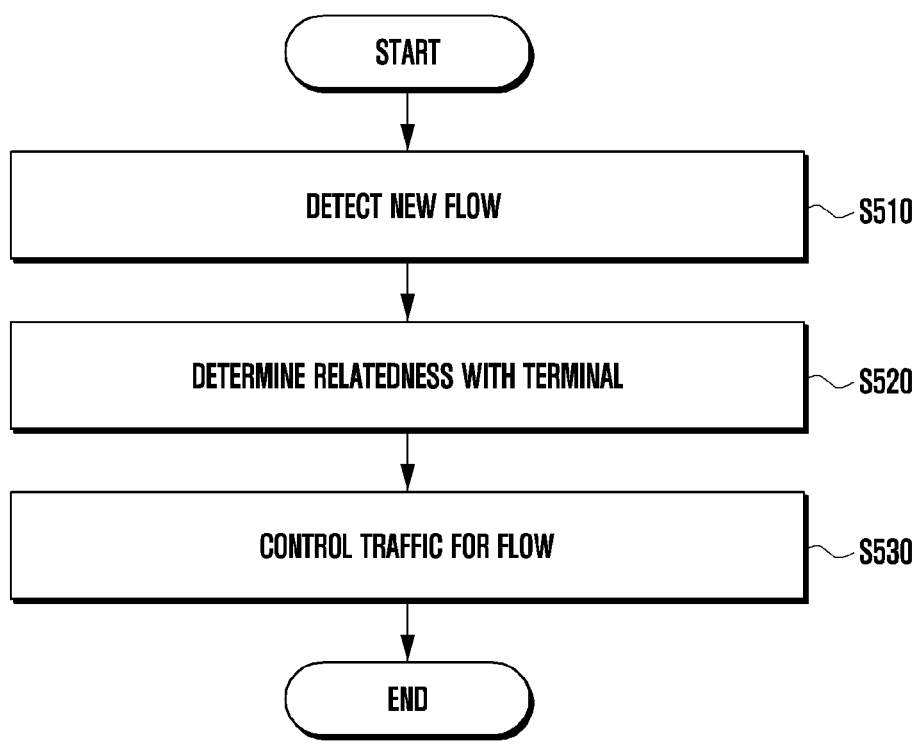
FIG. 5 is a flowchart of a method for traffic control performed by a first network device according to an embodiment of the disclosure.

FIG. 5 is a flowchart of a method for traffic control performed by the first network device according to an embodiment of the disclosure.

The operation according to the disclosure may be briefly described as follows. First, the first network device may detect, after a specific point in time, a new flow at the second network device connected to the first network device. Then, the first network device may check whether the detected new flow is associated with a new terminal connected to the second network device. Based on the check result, the first network device may control traffic for the flow of the terminal.

Every step in FIG. 5 is not necessarily an essential step, and a certain step may be omitted. The operation of the disclosure will be described in detail with reference to FIG. 5 and subsequent drawings.

First, prior to step S510, a new flow may be generated to provide a service to a user terminal. The new flow may be used for providing a service to a new terminal connected to the network device or for providing a new service to an existing terminal.

At step S510, the first network device may detect the new flow. The first network device may monitor flows passing through the first network device. Then, the first network device may detect generation of a new flow when finding an occurrence of a transmission control protocol (TCP) SYN packet or a specific number or more of user datagram protocol (UDP) packets not on the flow list.

A terminal can initiate communication by establishing a connection between both sides of the communication through a TCP SYN-SYNACK-ACK 3-way handshake process. Specifically, the SYN packet is a packet transmitted by the terminal to the counterpart for a connection request, the SYNACK packet is a packet transmitted by the counterpart to the terminal to notify that the connection request is accepted and it is ready to establish a connection, and the ACK packet is a packet transmitted by the terminal for connection establishment.

In addition, the first network device may identify the traffic type based on 5-tuple (source IP, destination IP, source port, destination port, protocol) information in the packet header of the new flow. The traffic type may be identified as a general service type such as video, realtime streaming, audio (music), game, web or download or as a specific service name from the server IP address of the flow, payload information of the initial data packet, traffic pattern, or the like.

At step S520, the first network device may determine whether the new flow is associated with a terminal newly connected to the second network device. That is, the first network device may determine whether the new flow is generated to provide a service for a new terminal or to provide a new service for an existing terminal.

The first network device may determine whether the detected new flow corresponds to a flow of a terminal newly connected to the second network device by using at least one of a timestamp (TS) or an Internet protocol identification (IPID). As the timestamp or IPID value is a unique characteristic of a terminal, if timestamp or IPID values of flow packets generated within the same time window are the same or close, the first network device may determine that they are flows of the same terminal. This determination process will be described in detail with reference to FIGS. 11 to 14.

For example, when the timestamp is used, the first network device may determine that they correspond to the flows of the same terminal by comparing the timestamp value of the TCP header information of a new flow packet with the timestamp value of the TCP header information of an existing flow packet having the same client IP generated within a specific window.

Additionally, the first network device may update the new flow list until whether the detected new flow is a flow of a new terminal connected to the second network device is determined. The new flow list will be described in detail with reference to FIG. 8.

At step S530, the first network device may control traffic of the terminal connected to the second network device based on the result of the determination. How to control the traffic of the terminal will be described in detail with reference to FIGS. 9, 10 and 15.

To control the traffic of the terminal, the first network device may set the quality of service (QoS) for at least one terminal connected to the second network device. In the QoS setting process, the first network device may adjust the bandwidth for at least one terminal connected to the second network device.

Based on whether the new flow is a flow of the new terminal and the traffic type of the new flow, the first network device may tag a new QoS tag or an existing QoS tag to the flow. Then, the first network device may update the flow list, the device list, and the QoS rule database based on the device identifier and the QoS tag, and may control traffic according to the QoS rule.

Figure 6:
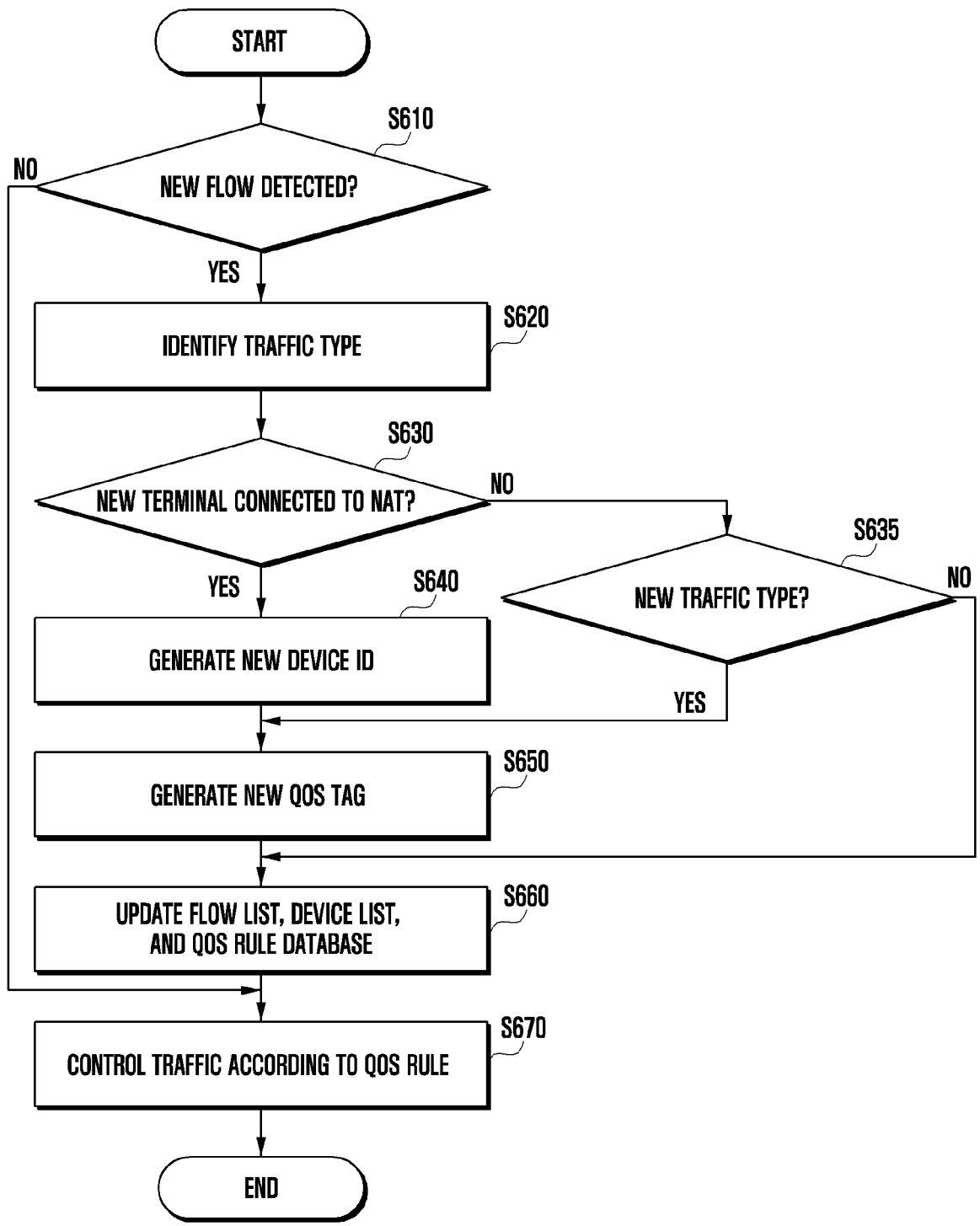
FIG. 6 is a flowchart of a method for the first network device to update a flow list, a device list, and a QoS rule database and control traffic based on whether a terminal is connected to the NAT after a specific point in time according to an embodiment of the disclosure.

FIG. 6 is a flowchart of a method in which the first network device updates a flow list, a device list, and a QoS rule database and controls traffic based on whether a new terminal is connected to the NAT according to an embodiment of the disclosure.

At step S610, the first network device may detect whether a new flow is generated in the second network device connected to the first network device. The first network device may detect whether a new flow is generated by monitoring flows passing through the first network device.

The method for detecting whether a new flow is generated may correspond to step S510 of FIG. 5. If no new flow is detected at step S610, the procedure may proceed to step S670 below.

At step S620, the first network device may identify the traffic type of the new flow. The first network device may identify the traffic type of the new flow based on the 5-tuple information. The method for traffic type identification may correspond to step S510 of FIG. 5.

At step S630, the first network device may determine whether anew terminal is connected in the NAT corresponding to the second network device. The determination method may correspond to step S520 of FIG. 5. Then, based on the determination result, the first network device may determine whether the new flow is generated to provide a service of the new terminal or to provide a new service of an existing terminal.

The details are as follows. When a new flow is detected at step S610 and a new terminal is connected to the NAT, the first network device may determine that the new flow is a flow for providing a service of the new terminal. In this case, the procedure may proceed to step S640, at which the first network device may generate a new device ID for the new terminal. Then, the first network device may generate a new QoS tag of the new flow for tagging at step S650.

When a new flow is detected at step S610 but it is determined that no new terminal is connected in the NAT, the procedure proceeds to step S635, at which the first network device may determine whether the traffic type of the new flow is a new traffic type. Hence, when the new flow corresponds to a flow of an existing terminal, if the traffic type is a new type, the procedure proceeds to step S650, at which the first network device may generate a new QoS tag for tagging. On the other hand, if the traffic type of the new flow is the same as an existing traffic type, the procedure proceeds to step S660, at which the first network device may perform tagging with the existing QoS tag.

At step S630, the first network device may update the new flow list until whether the detected new flow is a flow of the new terminal connected to the second network device is determined. The method of updating the new flow list will be described in detail with reference to FIG. 8.

At step S660, the first network device may update the flow list, the device list, and the QoS rule database. The first network device may insert the ID of the new flow in the flow list and update the device ID. The first network device may insert a flow ID in the device list having the same client IP and update the QoS tag according to the traffic type. The first network device may update the QoS tag back to the flow list. The method for updating the flow list and the device list will be described in detail with reference to FIGS. 9 and 10.

Then, the first network device may update the QoS rule database based on the flow list and the device list.

At step S670, the first network device may control traffic of the terminal connected to the second network device according to the QoS rule. The first network device may adjust the bandwidth for at least one terminal connected to the second network device. Hence, a minimum bandwidth may be guaranteed for each service of the terminal, and the maximum bandwidth of the terminal may be limited.

Additionally, the method for the first network device to control traffic of a terminal according to the QoS rule may include giving priority to a service flow in addition to adjusting the bandwidth.

Meanwhile, traffic control may be necessary not only when a new flow is generated but also when an existing flow is not used. The first network device may reclaim resources allocated to the flows not in use and allocate them to the flows in use.

Figure 7:
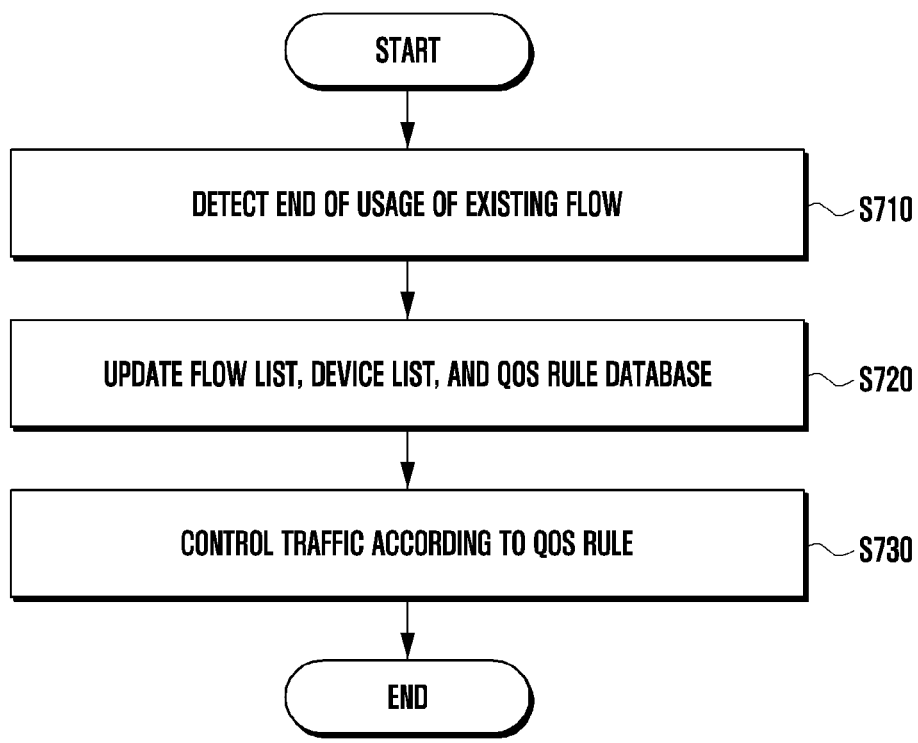
FIG. 7 is a flowchart of a method for deleting, when an existing flow is not used, the flow from the flow list and the device list and updating the QoS rule database.

FIG. 7 is a flowchart of a method for deleting, when an existing flow is not used, the flow from the flow list and the device list and updating the QoS rule database.

The operation according to this embodiment will be briefly described as follows. The first network device may detect the end of usage of an existing flow. Then, the first network device may delete the above flow from the flow list and the device list and update the QoS rule database. The first network device may control traffic according to the QoS rule.

First, at step S710, the first network device may detect the end of usage of an existing flow. The method for the first network device to detect the end of usage of an existing flow is as follows.

First, as the first network device can monitor flows passing through the first network device, it may identify the end of usage of a flow by detecting a FIN or RST packet that terminates the connection of a specific flow generated from a terminal or a server. Second, the first network device may detect the end of usage of an existing flow when a packet is not generated in the flow for a predetermined time (e.g., 1 minute).

At step S720, the first network device may delete the flow whose end of usage is detected from the flow list and the device list and update the QoS rule database. The process of deletion from the lists and updating the QoS rule database may correspond to step S660 of FIG. 6. In the flow list of FIG. 9 below, the row 910 to which F-ID2 belongs may be a row where the end of usage is detected and to be deleted from the flow list.

At step S730, the first network device may control traffic according to the QoS rule. This control process may correspond to step S670 of FIG. 6.

FIG. 8 is a table showing an example of a new flow list according to an embodiment of the disclosure.

The first network device may update the new flow list when a new flow is detected. The method for the first network device to update the new flow list is as follows.

When a new flow is detected, the first network device may register it in the above list. Then, the first network device may compare the new flow with existing flows and may add the ID of the compared device to the list. If the new flow is not the same as any of all the flows of existing terminals, it may be determined to be a flow of the new terminal.

When the new flow is identified as the same as a flow of an existing terminal or is identified as a flow of the new terminal, the first network device may immediately delete the new flow from the new flow list and register it in the flow list shown in FIG. 9 below.

The contents of FIG. 8 may be described for example as follows. It can be assumed that when a new flow is detected, a new flow ID is assigned in sequence from 1, and there are three devices having the same client IP (Dev1, Dev2, Dev3). The process of checking the new flow and the flow of an existing terminal may be unrelated to the number of the device. In addition, the device may be a terminal connected to the second network device.

In FIG. 8, the first network device may compare Fn1 (a flow with an assigned new flow ID of 1) with the flow of Dev1, Dev2, and Dev3, respectively. As Fn1 is not the same as any of the flows of the devices, Fn1 may be determined to be a flow of a new terminal. This new flow may be immediately deleted from the new flow list and may be registered in the flow list of FIG. 9 and the device list of FIG. 10 in sequence.

In FIG. 8, as Fn2 is not the same as a flow of Dev2, the first network device may add Dev2 as a Checked Dev ID item for Fn2 in the new flow list. Thereafter, Fn2 may be compared with a flow of unchecked Dev1 and Dev3. Then, Dev1 and Dev3 may be added as a Checked Dev ID item.

When the first network device detects a new flow, Fn5 may be newly added to the list of FIG. 8, and the Checked Dev ID item may be updated through comparing Fn5 with the flows of Dev1, Dev2, and Dev3.

Figure 9:
FIG. 9 is a table showing an example of a flow list according to an embodiment of the disclosure.

FIG. 9 is a table showing an example of a flow list according to an embodiment of the disclosure, and FIG. 10 is a table showing an example of a device list according to an embodiment of the disclosure.

The first network device may register a flow ID and a device ID (Dev ID) in the flow list of FIG. 9 through the new flow list of FIG. 8. The first network device may register a flow ID for each device in the device list of FIG. 10, and may generate a QoS tag of the flow based on being a new terminal or not and the type of traffic. Then, the first network device may update the QoS tag item in FIG. 9 with the generated QoS tag.

The contents of FIG. 9 and FIG. 10 may be described for example as follows. It can be seen that F-ID1 indicates registration of a first new flow, and the new flow is a flow of a terminal Dev1 and is the first flow of the first terminal, so the QoS tag is Qtag1.

In the flow list, the second row 910 to which the flow ID "F-ID2" corresponds may indicate that an existing flow has been deleted from the flow list and the device list upon detection of the end of usage as described in FIG. 7. The second row 910 is shaded only for convenience of description, and may be blank when the end of usage of the flow is detected.

When the terminal of F-ID3 and F-ID4 is registered as Dev1 in the flow list, QoS of the flow may be generated through the device list of FIG. 10. The first network device may register F-ID3 and F-ID4 for Dev1 in the device list. Based on the traffic type of the flow, the first network device may generate a QoS tag "Qtag1" for F-ID3 having the same traffic type as F-ID1 and generate a QoS tag "Qtag2" for F-ID4 having a different traffic type. Then, the first network device may update the QoS tag item of FIG. 9 with the generated QoS tag.

In addition, when Dev2 is registered as the terminal of F-ID5, the first network device may register F-ID5 for Dev2 in the device list. As F-ID5 corresponds to a flow of a new terminal, the first network device may generate a QoS tag "Qtag3" and update the QoS tag item of FIG. 9 with the generated QoS tag.

Figure 11:
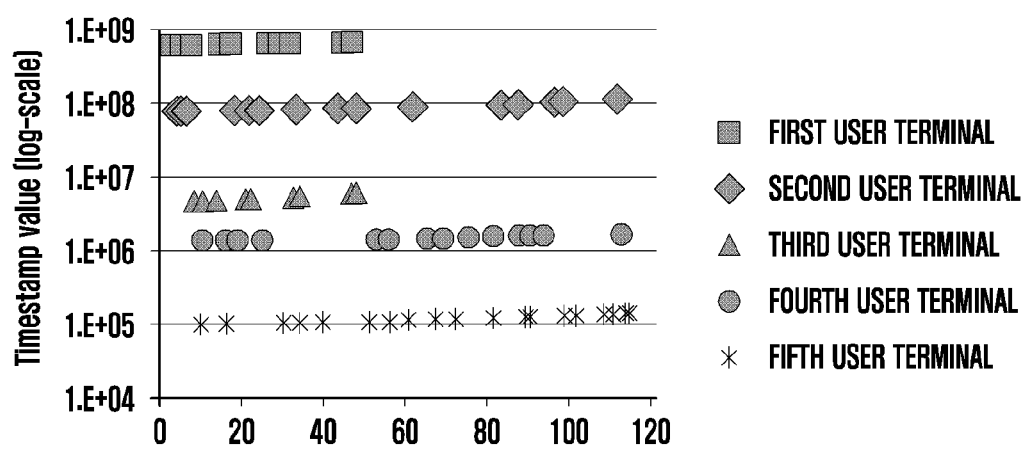
FIG. 11 illustrates TCP timestamp values over time for different terminals according to an embodiment of the disclosure.

FIG. 11 illustrates TCP timestamp values over time for different terminals according to an embodiment of the disclosure.

A timestamp (TS) may be present in a TCP option filed of the packet header. The timestamp may represent a relative time from the boot time of the terminal to the packet generation time as a 32-bit value. In FIG. 11, as the timestamp value of each terminal does not decrease, the timestamp may increase monotonically.

The timestamp value may vary in terms of the start value and the per-time increment according to the type and boot time of each terminal. Hence, as there is a very low probability that multiple different terminal boot times and per-time TS increments have the same value, if the difference in TS values between packets belonging to a given range at a specific time is large, the first network device may determine that the terminals having generated the packets are different terminals. In addition, as the timestamp value is a unique characteristic of a terminal, when timestamp values of flow packets are the same, the first network device may determine that they are flows of the same terminal.

It can be seen from FIG. 11 that the initial timestamps of different terminals are different. It can also be seen that the timestamp values of different terminals are different at any point in time.

Meanwhile, depending on the OS (e.g., Windows) or configuration, the timestamp option may be disabled. For example, a terminal with a Windows-based OS may represent the identification field (IPID) of the IP header as a 16-bit value. Similar to the timestamp, the IPID value may be the same for each terminal. In addition, the IPID value may monotonically increase by 0 or 1 per packet regardless of the flow. Therefore, when the timestamp value is not available, the first network device may compare the IPID values to check whether the terminals are different.

Figure 12:
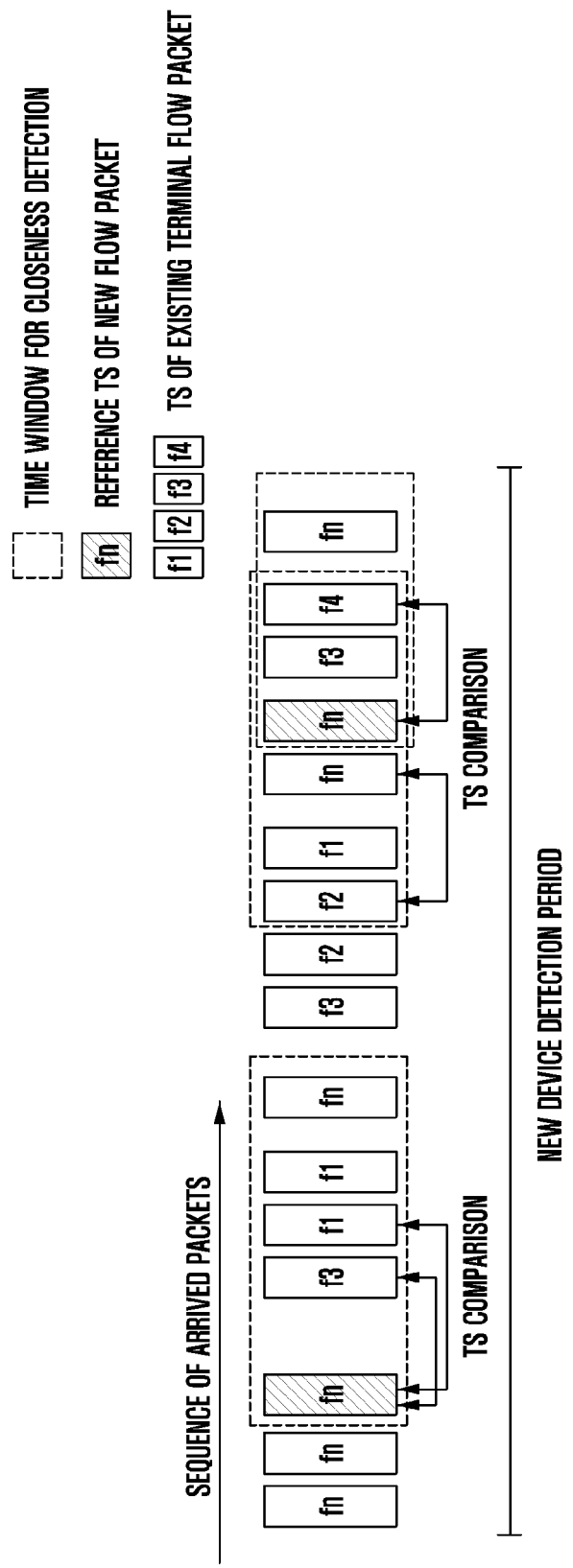
FIG. 12 depicts a scheme for checking whether a flow generated after a specific point in time is associated with a terminal connected to the second network device after the specific point in time by using timestamp values according to a first embodiment of the disclosure.
Figure 13:
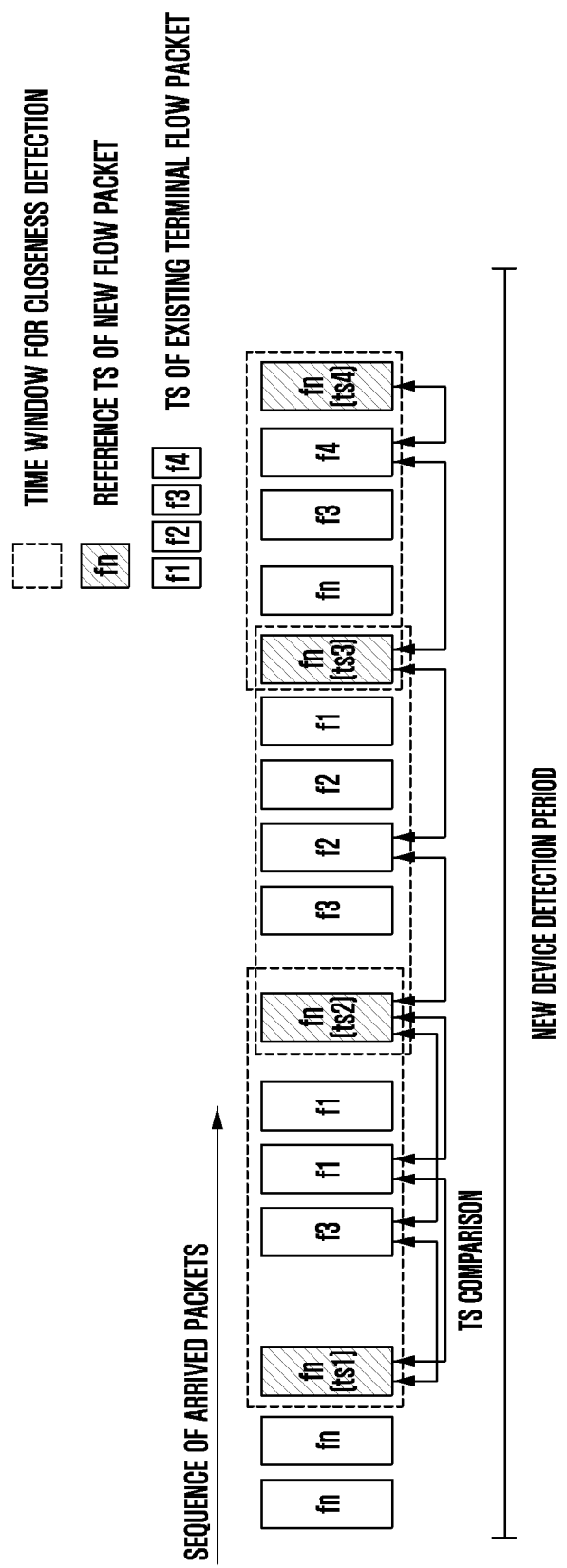
FIG. 13 depicts a scheme for checking whether a flow generated after a specific point in time is associated with a terminal connected to the second network device after the specific point in time by using timestamp values according to a second embodiment of the disclosure.

Additionally, the TS or IPID value increases from 0 again after reaching the maximum value (e.g., $2^{32}-1$ or $2^{16}-1$) that can be represented by the corresponding number of bits. In FIGS. 12 and 13 below, the first network device may reflect this characteristic when comparing packets.

In addition, as the first network device compares TS or IPID values of packets at the moment of checking whether they are flows of the same terminal, the first network device may determine whether they are flows of the same terminal by using the TS or IPID values at the moment of comparison.

Meanwhile, when a new flow is detected, the first network device may determine whether the new flow corresponds to a flow of a new terminal connected to the second network device. In the above process, the first network device may perform this determination by using at least one of a timestamp (TS) or an Internet Protocol Identification (IPID). As the timestamp or IPID value is a unique characteristic of a terminal, if timestamp or IPID values of flow packets are the same, the first network device may determine that they are flows of the same terminal.

FIG. 12 depicts a scheme for checking whether a flow generated after a specific point in time is associated with a terminal connected to the second network device after the specific point in time by using timestamp values according to a first embodiment of the disclosure.

The first network device may set at least one time window during a specific new device detection period. The time window may include packets generated for a specific time with respect to a packet in the new flow.

Then, the first network device may compare the timestamp value of a packet generated in an existing flow with the timestamp value of a packet generated in the new flow within the time window. Specifically in FIG. 12, the first network device may compare the timestamp value of packets (f1, f2, f3, f4) in a flow of an existing terminal generated within a specific time window with respect to a packet (fn) in the new flow and the timestamp value of fn.

In the comparison process, if the timestamp value of fn and the timestamp value of the packet in an existing flow are close, the first network device may determine that the new flow is a flow of the existing terminal. The method of determining whether the timestamp values are close may be a check method based on whether the difference between the timestamp value of fn and the timestamp value of a packet of the existing terminal exceeds a specific threshold value. However, the above closeness may be determined in consideration of a characteristic that the timestamp value increases again from 0 after reaching the maximum value (e.g., 2^32-1) that can be represented by the corresponding number of bits.

For example, assuming that the threshold value is 10, the timestamp value of a packet in the new flow is 2^32-1, and the timestamp value of a packet in a flow of an existing terminal is 0, even if the difference in time stamp value exceeds the threshold value, it can be determined that the new flow is a flow of the existing terminal.

In the case of FIG. 12, the first network device may determine whether the packet (fn) in the new flow and the packets (f1 and f3) in a flow of the existing terminal are close in the first time window. Based on this determination result, the first network device may update the new flow list of FIG. 8.

For the timestamp value comparison in the second time window, the first network device may skip the timestamp value of a repeated packet in the flow of the existing terminal. That is, the first network device may check whether the timestamp value of f2 and the timestamp value of fn are close to each other except for timestamp values of the flow packets f1 and f3. Additionally, in the third time window, whether the timestamp value of f4 is close to the timestamp value of fn may be checked.

Meanwhile, as the timestamp and the IPID have the same characteristics that their values monotonically increase except for the maximum value (e.g., 2^32-1 or 2^16-1) that can be represented by the OS and the corresponding number of bits for each terminal regardless of the flow, the first network device may determine whether the new flow corresponds to a flow of a new terminal connected to the second network device by using IPID values as in the first embodiment of FIG. 12.

FIG. 13 depicts a scheme for checking whether a flow generated after a specific point in time is associated with a terminal connected to the second network device after the specific point in time by using timestamp values according to a second embodiment of the disclosure.

The first network device may configure at least one reference timestamp window during a specific new device detection period. The reference timestamp window may include packets generated during a time between packets of a new flow. Specifically in FIG. 13, the reference timestamp window may include packets between the first packet fn (ts1) and the second packet fn (ts2) of the new flow.

In the reference timestamp window, the first network device may determine whether the timestamp value of a packet generated in the existing flow is included between the timestamp values of packets generated in the new flow. In the determination process, if the timestamp value of the packet in the existing flow is included between the timestamp values of fn's, the first network device may determine that the new flow is a flow of the existing terminal.

However, the above includedness may be determined in consideration of a characteristic that the timestamp value increases again from 0 after reaching the maximum value (e.g., 2^32-1) that can be represented by the corresponding number of bits.

For example, assuming that the timestamp value of fn (ts1) is 2^32-1, the timestamp value of fn (ts2) is 2, and the timestamp value of a packet in a flow of an existing terminal is 0, even if the timestamp value of the packet in the flow of the existing terminal is not included between the timestamp values of the packets in the new flow, it can be determined that the new flow is a flow of the existing terminal.

In the case of FIG. 13, in the first reference timestamp window, the first network device may determine whether the timestamp values of packets f1 and f3 in the flow of the existing terminal are included between the timestamp values of packets fn (ts1) and fn (ts2) in the new flow. Based on the determination result, the first network device may update the new flow list of FIG. 8.

In the second reference timestamp window, the first network device may omit checking whether the timestamp value of a repeated packet in the flow of the existing terminal is included. That is, the first network device may check whether the timestamp value of f2 is included between the timestamp values of packets fn (ts2) and fn (ts3) except for the timestamp value of flow packets f1 and f3. Then, in the third reference timestamp window, whether the timestamp of f4 is included between the timestamp values of packets fn (ts3) and fn (ts4).

Meanwhile, as the timestamp and the IPID have the same characteristics that their values monotonically increase except for the maximum value (e.g., 2^32-1 or 2^16-1) that can be represented by the OS and the corresponding number of bits for each terminal regardless of the flow, the first network device may determine whether the new flow corresponds to a flow of a new terminal connected to the second network device by using IPID values as in the second embodiment of FIG. 13.

Figure 14:
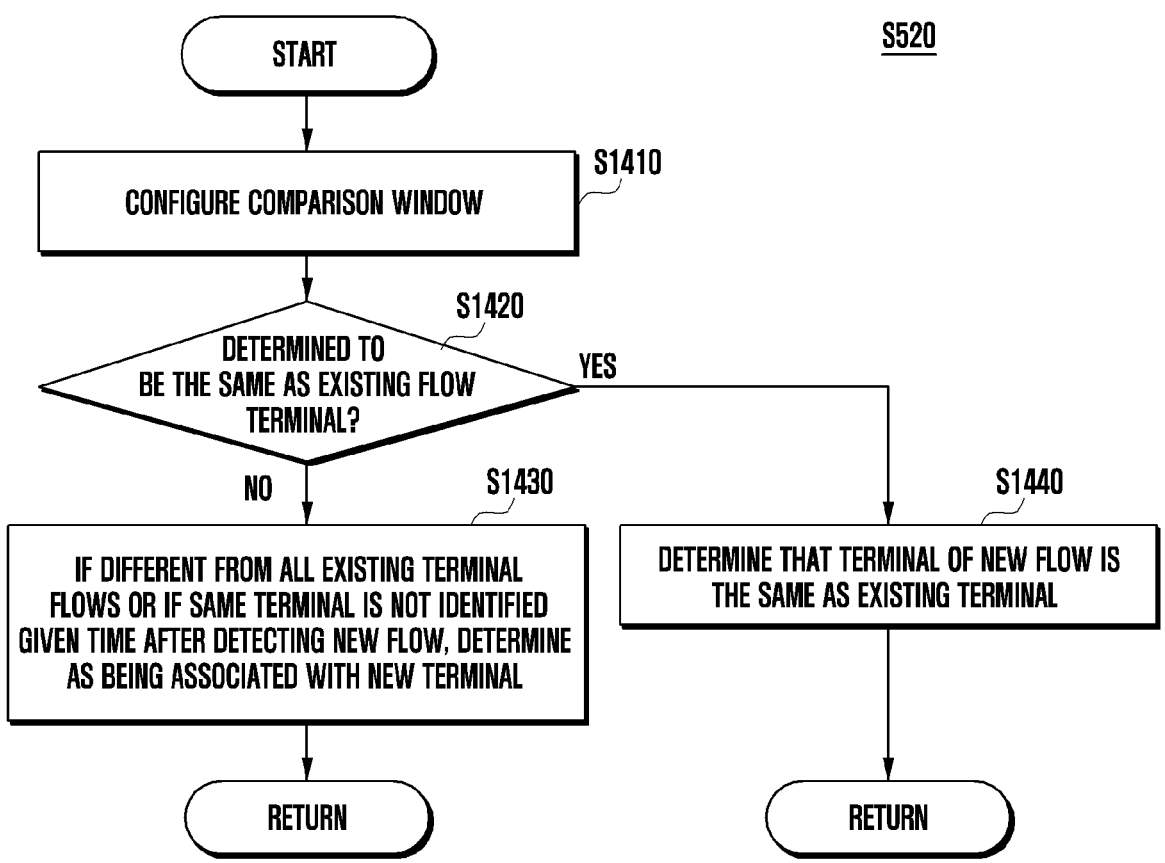
FIG. 14 is a flowchart of a method for checking whether a flow generated after a specific point in time is associated with a terminal connected to the second network device after the specific point in time in comparison to a packet of a flow generated before the specific point in time according to an embodiment of the disclosure.

FIG. 14 is a flowchart of a method for checking whether a flow generated after a specific point in time is associated with a terminal connected to the second network device after the specific point in time in comparison to a packet of a flow generated before the specific point in time according to an embodiment of the disclosure.

The operation according to this embodiment may be briefly described as follows. The first network device may configure a comparison window including a packet of a new flow. The first network device may compare an existing flow packet with the packet of the new flow in the comparison window to check whether it is the same as a terminal of the existing flow. Then, it may be determined that the new flow is a flow of an existing terminal, or that the new flow is a flow of a new terminal because it is different from any of the existing terminals.

At step S1410, the first network device may configure a comparison window to compare a packet of the new flow with a packet of a flow of an existing terminal. In the first embodiment of FIG. 12, the first network device may configure a time window including packets in a predetermined time range with respect to the packet of the new flow. In the second embodiment of FIG. 13, the first network device may configure a reference timestamp window including packets generated during the interval between the packet of the new flow and the next packet.

At step S1420, the first network device may compare the packet in the flow of the existing terminal with the packet of the new flow in the comparison window to determine whether it is the same as a terminal of the existing flow. Upon determining that the new flow is a flow of the existing terminal, the first network device may proceed to step S1440 below. If the new flow is different from all flows of the existing terminals, or if the same terminal is not identified for a given time after detecting the new flow, the first network device may determine that the new flow is a flow of a new terminal connected to the second network device, and the procedure may proceed to step S1430 below.

In the first embodiment of FIG. 12, the first network device may perform the above determination process based on whether the difference in the timestamp value exceeds a specific threshold value. In the second embodiment of FIG. 13, the first network device may perform the above determination process based on whether the timestamp value of a packet in a flow of the existing terminal is included in the range of the timestamp values of packets in the new flow.

At step S1430, if all the flows of the existing terminals are different from the new flow, or if the same terminal is not identified for a given time after detecting the new flow, the first network device may determine that the new flow is a flow of the new terminal. The first network device may start a timer when a new flow is detected at step S510 of FIG. 5. Then, if it is not identified as a flow of the existing terminal until the timer expires (timeout), the first network device may determine that the new flow is a flow of a new terminal connected to the second network device.

The new flow may be registered in the flow list of FIG. 9 and the device list of FIG. 10 and a new QoS tag may be updated.

On the other hand, step S1440 is a case where the new flow is identified as a flow of an existing terminal. The new flow may be registered in the flow list of FIG. 9 and the device list of FIG. 10, and a QoS tag may be generated based on the traffic type.

Figure 15:
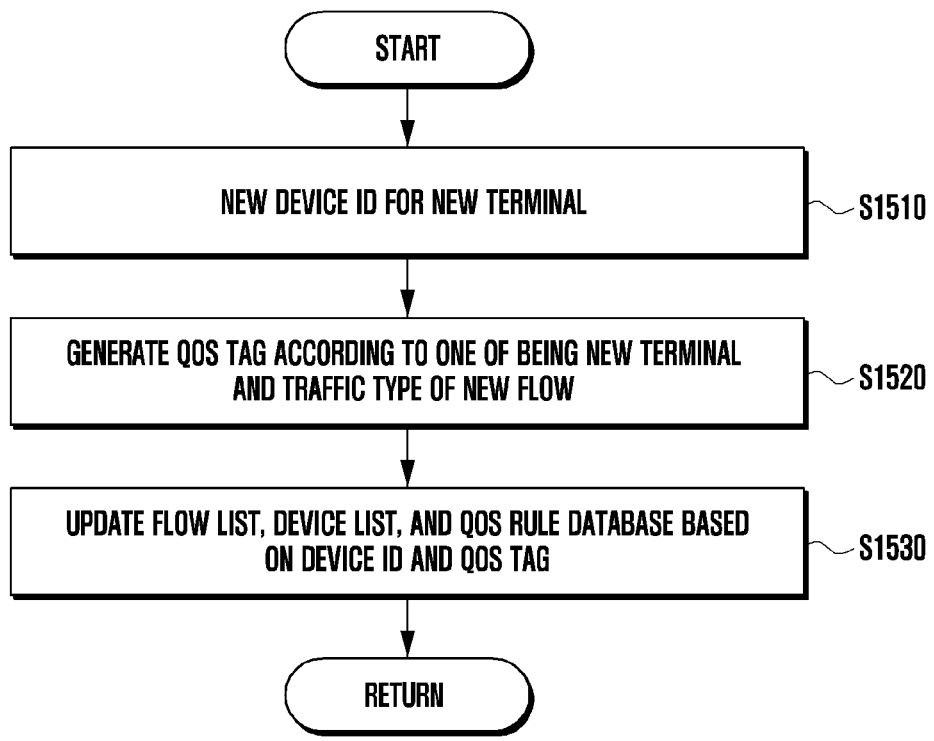
FIG. 15 is a flowchart of a method for controlling traffic of a terminal according to an embodiment of the disclosure.

FIG. 15 is a flowchart of a method for controlling traffic of a terminal according to an embodiment of the disclosure.

The operation according to this embodiment may be briefly described as follows. The first network device may generate a new device ID for a new terminal. The first network device may generate a QoS tag according to one of being a new terminal and the traffic type of a new flow. Then, the first network device may update the flow list, the device list, and the QoS rule database based on the device identifier and the QoS tag.

To control the traffic of the terminal, the first network device may set QoS for at least one terminal connected to the second network device. The QoS setting method may be a method of adjusting the bandwidth for the terminal.

At step S1510, the first network device may generate a new device ID and assign the new device ID to the new terminal of the detected new flow. The device ID may be the ID of a new terminal connected to the NAT device and having the same client IP. That is, the device ID may be the ID of a new terminal connected to the second network device.

In addition, the first network device may register the device ID in the flow list and the device list. In the flow list of FIG. 9, for example, when a new flow is detected and a new terminal is identified, F-ID9 may be registered for the flow ID and Dev3 may be registered for the device ID.

At step S1520, the first network device may generate a QoS tag according to either being a flow of a new terminal or the traffic type of the new flow. If a flow of a new terminal is detected at step S510 of FIG. 5, the first network device may generate a new QoS tag and tag the new flow with the QoS tag.

Although the detected new flow corresponds to a flow of the existing terminal, if it is different from the traffic type of the flow of the existing terminal, the first network device may generate a new QoS tag and tag the new flow with the QoS tag. That is, this case may mean that the existing terminal uses a new service.

When the detected new flow corresponds to a flow of the existing terminal, if the traffic type of the flow of the existing terminal is also the same, the first network device may tag the new flow with an existing QoS tag. This case may mean that the existing terminal uses plural services of the same type.

The process of generating a QoS tag may correspond to the process of generating a QoS tag in the device list of FIG. 10.

At step S1530, the first network device may update the flow list, the device list, and the QoS rule database based on the device identifier and the QoS tag. The first network device may control traffic of the user terminals and the flows according to the updated QoS rules.

The method for traffic control may include a scheme of ensuring a minimum bandwidth for a specific terminal in consideration of the number of terminals connected to the second network device being is a NAT device, and a scheme of limiting the maximum bandwidth for a specific terminal in consideration of the number of services used by the terminal. The above method will be described in detail with reference to FIGS. 16A, 16B and 17 below.

Figure 16A:
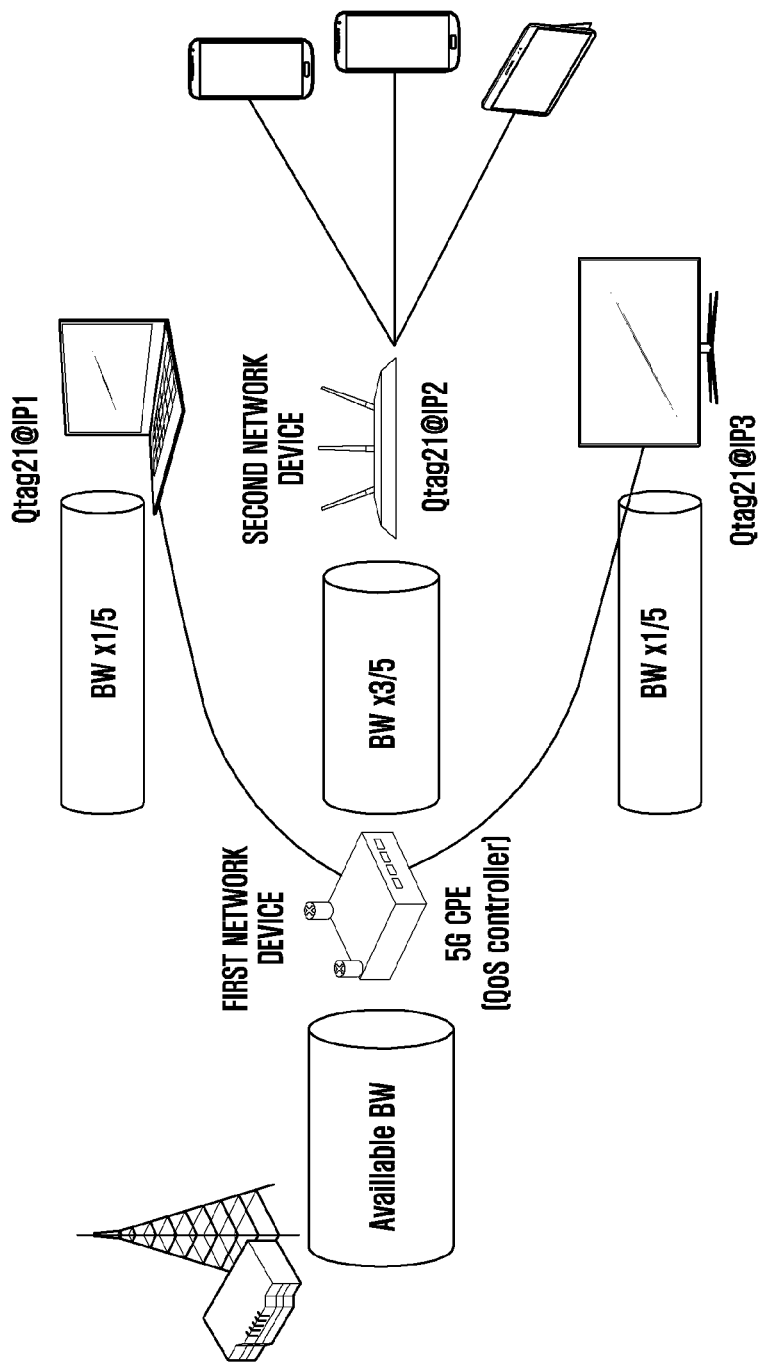
FIG. 16A depicts a scheme for guaranteeing a minimum bandwidth and limiting a maximum bandwidth based on the number of connected terminals according to an embodiment of the disclosure.

FIG. 16A depicts a scheme for guaranteeing a minimum bandwidth based on the number of connected terminals according to an embodiment of the disclosure.

In FIG. 16A, the first network device may correspond to a 5G CPE, and the second network device may correspond to a NAT device. The first network device may allocate an available bandwidth in consideration of the number of terminals connected to the second network device.

FIG. 16A may be described for example as follows. Although there are a total of three terminals connected to the first network device including two active terminals (M) and one NAT device (second network device), the first network device may allocate the available bandwidth in consideration of three active terminals (N) connected to the NAT device. That is, among the total available bandwidth (BW), BW*N/(M+N)=BW*3/5 may be allocated to the second network device.

Further, the first network device may assign a weight w to the second network device if necessary. Then, the first network device may allocate an available bandwidth of BW*w*N/(M+N) to the second network device.

Figure 16B:
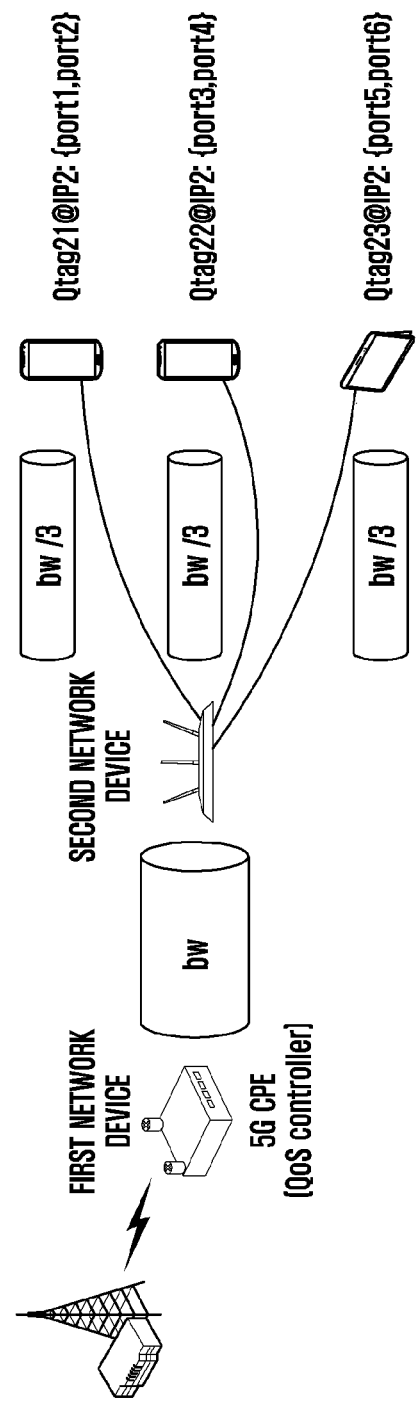
FIG. 16B depicts a scheme for limiting a maximum bandwidth of a terminal based on the number of flows for each terminal according to an embodiment of the disclosure.

FIG. 16B depicts a scheme for limiting a maximum bandwidth of a terminal based on the number of flows per terminal according to an embodiment of the disclosure.

In FIG. 16B, the first network device may correspond to a 5G CPE, and the second network device may correspond to a NAT device. The first network device may restrict allocation of the available bandwidth in consideration of the number of flows of a terminal connected to the second network device.

FIG. 16B may be described for example as follows. The bandwidth allocated by the first network device to the second network device may be assumed to be BW*3/5=bw. Then, the first network device may limit the maximum bandwidth to bw*1/n=bw/3 with a division by three active terminals (n) of the second network device regardless of the number of flows per terminal.

In addition, if necessary, the first network device may assign separate weights u1, u2 and u3 (u1+u2+u3=1) according to applications, flows, and the like used by each terminal. The first network device may allocate a bandwidth of bw*u1*1/3 for a terminal connected to the second network device.

However, the methods for guaranteeing a minimum bandwidth and limiting a maximum bandwidth to a terminal are not limited to the above schemes, and the first network device can perform traffic control in various ways. The first network device may set a guaranteed bit rate (GBR) among the QoS parameters to ensure a minimum bandwidth of a terminal. In addition, the first network device may set a maximum bit rate (MBR) among the QoS parameters to limit the maximum bandwidth of a terminal.

Figure 17:
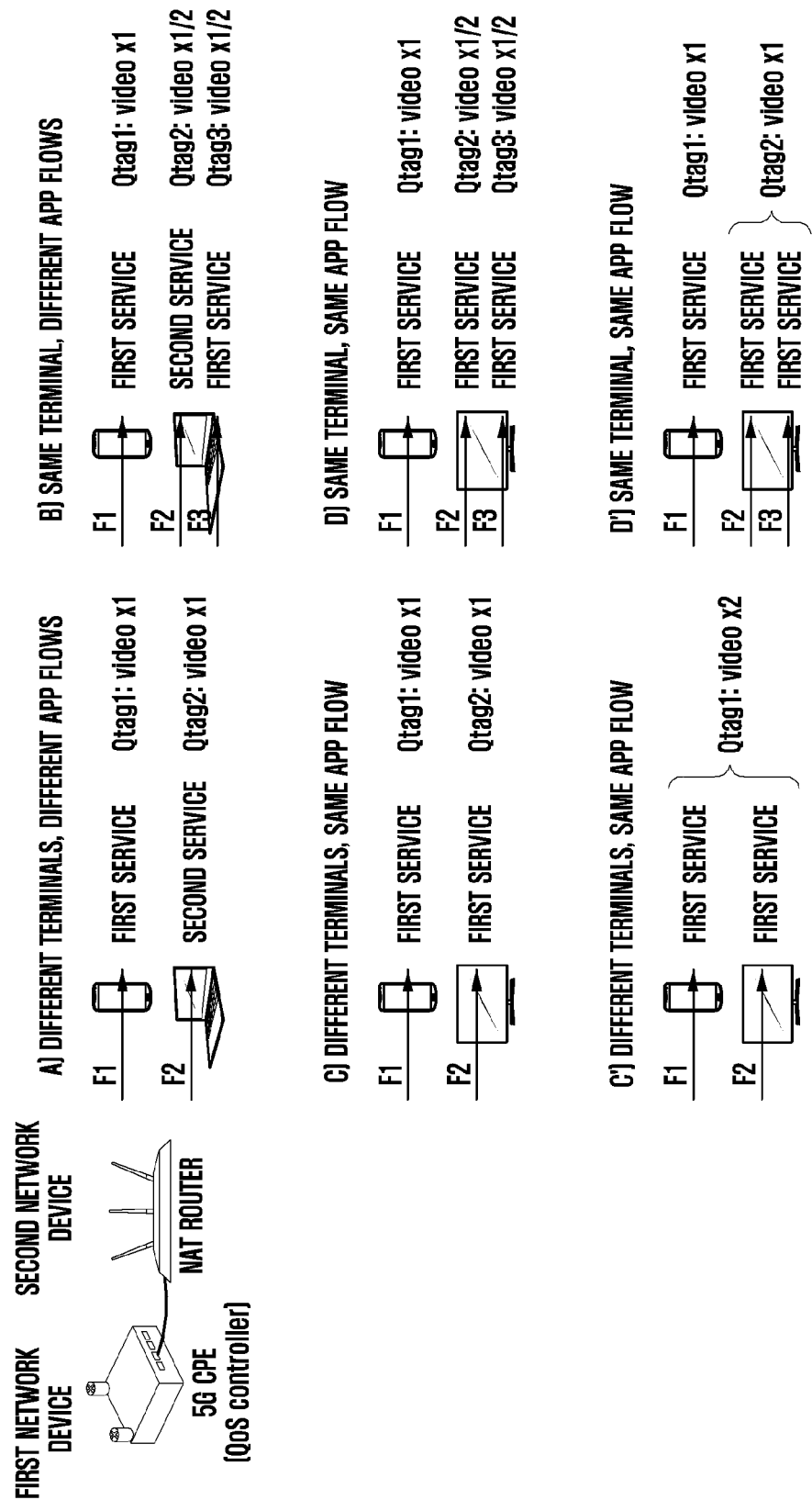
FIG. 17 illustrates a scheme for generating QoS tags based on the terminal and traffic type and improving efficiency of the first network device according to an embodiment of the disclosure.

FIG. 17 illustrates a scheme for generating QoS tags based on the terminal and traffic type and improving efficiency of the first network device according to an embodiment of the disclosure. It can be assumed that the service flows are generated in sequence according to the number appended to the flows. That is, F1 may be generated before F2 and assigned a QoS tag.

The first network device may generate a QoS tag for each flow. Specifically, the first network device may assign a QoS tag to each flow of different terminals. For flows of the same terminal, if their traffic types are different, the first network device may assign a QoS tag to each flow. Parts a) and b) of FIG. 17 indicate QoS tags assigned by the above method.

In part a) of FIG. 17, as a first flow (F1) and a second flow (F2) are associated with different terminals and have different traffic types, the first network device may generate a new QoS tag (Qtag2) for F2 and generate a QoS rule for Qtag2.

Part b) of FIG. 17 illustrates QoS generation when F1 and F2 are assigned QoS and a third flow (F3) is connected. As F3 is associated with the same terminal as F2 but has a different traffic type, the first network device may generate a new QoS tag (Qtag3) and may update the QoS rule of Qtag2 together with configuring a QoS rule for Qtag3.

In the above process, the first network device may assign QoS for each flow to thereby guarantee a minimum bandwidth. In addition, the first network device may assign weights to flows of different service types associated with the same terminal to thereby limit the maximum bandwidth of the terminal.

Meanwhile, generating separate QoS tags for individual flows is a preferred way for traffic control, but there is a risk of overloading the first network device. Accordingly, when the terminals are the same or the traffic types are the same, the first network device may tag a plurality of flows with the same QoS tag. In the above process, the first network device may assign a weight to the QoS tag to ensure smooth servicing to each terminal.

In part c) of FIG. 17, as a first flow (F1) and a second flow (F2) have the same traffic type but are associated with different terminals, the first network device may generate a new QoS tag (Qtag2) for F2 and generate a QoS rule for Qtag2.

In part c') of FIG. 17, as a first flow (F1) and a second flow (F2) are associated with different terminals but have the same traffic type, the first network device may assign Qtag1, which is the same as the QoS tag of F1, to F2. Here, to provide a smooth service, the first network device may update the QoS rule by multiplying Qtag1 and a given weight (e.g., doubling).

Comparing the cases of parts c) and c'), as the number of QoS tags assigned to the terminals is reduced, the efficiency of the first network device can be increased.

Part d) of FIG. 17 illustrates QoS generation when F1 and F2 are assigned QoS and a third flow (F3) is connected. Although F3 and F2 are associated with the same terminal and have the same traffic type, to guarantee the minimum bandwidth for each service flow, the first network device may generate a new QoS tag (Qtag3) and update the QoS rule of Qtag2 together with configuring a QoS rule for Qtag3.

In the above process, the first network device may limit the maximum bandwidth of the terminal by assigning weights to flows having the same traffic type and associated with the same terminal.

In part d') of FIG. 17, as F2 and F3 are associated with the same terminal and have the same traffic type, the first network device may assign the QoS tag of F2 to F3. Additionally, the first network device may update the QoS rule by multiplying Qtag2 and a given weight b (e.g., 1).

Figure 18:
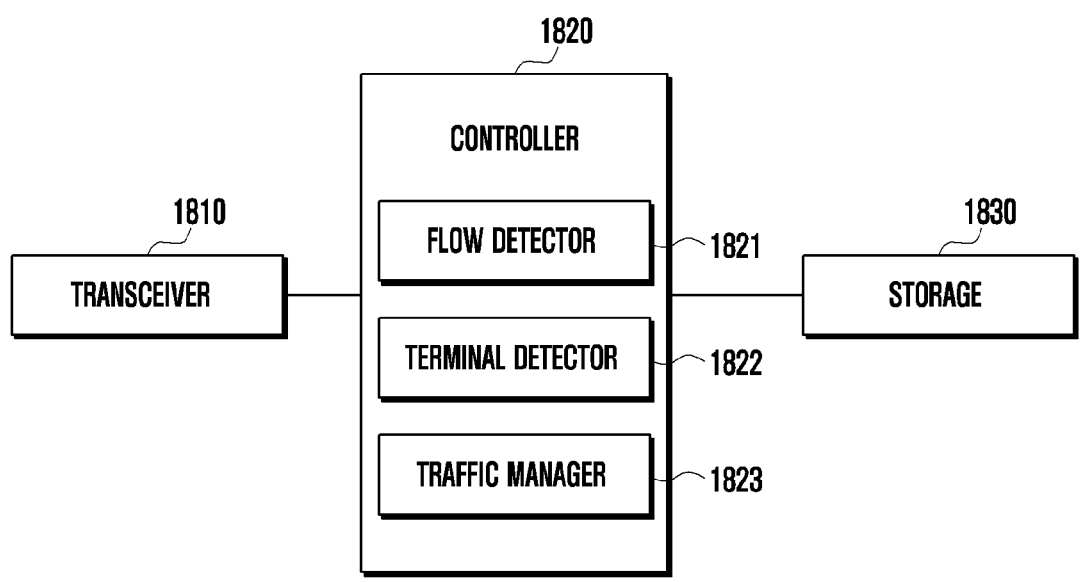
FIG. 18 is a block diagram illustrating an internal structure of the first network device according to an embodiment of the disclosure.

FIG. 18 is a block diagram illustrating the internal structure of a first network device according to an embodiment of the disclosure. As shown in FIG. 18, the first network device of the disclosure may include a transceiver 1810, a controller 1820, and a storage 1830.

The transceiver 1810 of the first network device transmits and receives signals. Specifically, the transceiver 1810 connects an internet network and a user terminal and performs transmission and reception of messages and data. To this end, the transceiver 1810 may include a wired or wireless interface. The transceiver 1810 may connect the internet network and at least one terminal directly or via a second network device.

The controller 1820 of the first network device may control the overall operation of the first network device. In particular, the controller 1820 may further include a flow detector 1821 to detect whether a new flow passes through the first network device, a terminal detector 1822 to determine whether a detected new flow is a flow of a new terminal connected to the second network device, and a traffic manager 1823 to control the traffic of a terminal connected to the second network device based on the above determination result.

The flow detector 1821 may detect a new flow passing through the first network device. The flow detector 1821 may detect generation of a new flow upon finding an occurrence of a transmission control protocol (TCP) SYN packet or a specific number or more of user datagram protocol (UDP) packets not on the flow list.

Additionally, the flow detector 1821 may identify the traffic type of the new flow. The methods for new flow detection and traffic type identification of the flow detector 1821 may correspond to step S510 of FIG. 5.

The terminal detector 1822 may determine whether the new flow is a flow of a new terminal connected to the second network device. The terminal detector 1822 may perform the above determination by using at least one of the timestamp or the IPID. The terminal detector 1822 may compare IP headers, TCP headers, and payload data of flow packets passing through the first network device for the determination.

In addition, the terminal detector 1822 may update the new flow list until whether the detected new flow is a flow of a new terminal connected to the second network device is determined.

The result of the determination of the terminal detector 1822 may be stored in the storage 1830 below. The determination method of the terminal detector may correspond to the first embodiment of FIG. 12, the second embodiment of FIG. 13, and FIG. 14.

The traffic manager 1823 may control traffic passing through the first network device. The traffic manager 1823 may control traffic by configuring QoS for at least one terminal connected to the second network device connected to the first network device.

The traffic manager 1823 may update the flow list, the device list, and the QoS rule database based on the result of the determination of the terminal detector 1822 and store them in the storage 1830 below. The traffic manager 1823 may control the traffic of a terminal based on the QoS rule, and may assign weights to individual terminals to guarantee a minimum bandwidth and limit the maximum bandwidth.

The traffic control method of the traffic manager 1823 may correspond to step S530 of FIG. 5 and step S630 of FIG. 6, and is described in detail with reference to FIGS. 15, 16 and 17.

The above functions may be performed in lower components belonging to the controller 1820 or may be performed in the controller 1820.

The storage 1830 of the first network device may store information related to traffic control of a terminal. In an embodiment of the disclosure, the storage 1830 may store information regarding flows passing through the first network device.

The storage 1830 may store information regarding the new flow list of FIG. 8, the flow list of FIG. 9, and the device list of FIG. 10. The storage 1830 may store information on the QoS rule database updated by the first network device based on the above information.

In addition, the storage 1830 may store timestamp or IPID values for checking whether a new flow is a flow of a new terminal connected to the second network device.

Embodiments of the disclosure disclosed in the specification and drawings are intended to easily describe the technical contents of the disclosure and to provide specific examples to help understanding of the disclosure, and are not intended to limit the scope of the disclosure. It should be apparent to those skilled in the art to which the disclosure pertains that other modified examples based on the technical idea of the disclosure can be carried out in addition to the embodiments disclosed herein.

The invention claimed is:

1. A method for a first network device to control traffic of a terminal in a wireless communication network, the method comprising:
   detecting a first flow generated after a specific point in time in a second network device connected to the first network device;
   determining whether the detected first flow is associated with a first terminal connected to the second network device after the specific point in time; and
   controlling traffic of the terminal based on a result of the determining.

2. The method of claim 1, wherein the determining whether the detected first flow is associated with a first terminal is determining whether the detected first flow corresponds to a flow of the first terminal by using at least one of a timestamp (TS) or an internet protocol identification (IPID).

3. The method of claim 2, wherein the determining whether the detected first flow corresponds to a flow of the first terminal by using the timestamp is:
   configuring a time window based on a packet generated in the first flow;
   comparing, in the time window, a timestamp value of a packet generated in a second flow created before the specific point in time with a timestamp value of the packet generated in the first flow;
   determining that a terminal of the second flow and a terminal of the first flow are different in case that a result of the comparing exceeds a predetermined value; and
   determining that the detected first flow is a flow of the first terminal in case that terminals of all the second flows of the second network device are different from the terminal of the first flow or same terminal is not identified until a given time elapses after detection of the first flow.

4. The method of claim 2, wherein the determining whether the detected first flow corresponds to a flow of the first terminal by using the IPID is:
   configuring an IPID window based on a packet generated in the first flow;
   comparing, in the IPID window, an IPID value of a packet generated in a second flow created before the specific point in time with an IPID value of the packet generated in the first flow;
   determining that a terminal of the second flow and a terminal of the first flow are different in case that a result of the comparing exceeds a predetermined value; and
   determining that the detected first flow is a flow of the first terminal in case that terminals of all the second flows of the second network device are different from the terminal of the first flow or same terminal is not identified until a given time elapses after detection of the first flow.

5. The method of claim 2, further comprising updating a new flow list until whether the detected first flow is a flow of the first terminal is determined.

6. The method of claim 1, wherein the controlling traffic of the terminal is configuring a quality of service (QoS) for at least one terminal connected to the second network device.

7. The method of claim 6, wherein the configuring QoS is:
   generating a new device identifier (device ID) for the first terminal in case that the first terminal is connected to the second network device;
   generating a QoS tag according to at least one of whether the detected first flow is a flow of the first terminal or a traffic type of the detected first flow; and
   updating a flow list, a device list, and a QoS rule database based on the device ID and the QoS tag.

8. A first network device for controlling traffic of a terminal in a wireless communication network, comprising:
   a transceiver configured to transmit and receive signals; and
   a controller configured to detect a first flow generated after a specific point in time in a second network device connected to the first network device, determine whether the detected first flow is associated with a first terminal connected to the second network device after the specific point in time, and control traffic of the terminal based on a result of the determining.

9. The first network device of claim 8, wherein the controller further comprises a terminal detector that is configured to determine whether the detected first flow corresponds to a flow of the first terminal by using at least one of a timestamp (TS) or an internet protocol identification (IPID).

10. The first network device of claim 9, wherein the terminal detector is configured to configure a time window based on a packet generated in the first flow, compare, in the time window, a timestamp value of a packet generated in a second flow created before the specific point in time with a timestamp value of the packet generated in the first flow, determine that a terminal of the second flow and a terminal of the first flow are different in case that a result of the comparing exceeds a predetermined value, and determine that the detected first flow is a flow of the first terminal in case that terminals of all the second flows of the second network device are different from the terminal of the first flow or same terminal is not identified until a given time elapses after detection of the first flow.

11. The first network device of claim 9, wherein the terminal detector is configured to configure an IPID window based on a packet generated in the first flow, compare, in the IPID window, an IPID value of a packet generated in a second flow created before the specific point in time with an IPID value of the packet generated in the first flow, determine that a terminal of the second flow and a terminal of the first flow are different in case that a result of the comparing exceeds a predetermined value, and determine that the detected first flow is a flow of the first terminal in case that terminals of all the second flows of the second network device are different from the terminal of the first flow or same terminal is not identified until a given time elapses after detection of the first flow.

12. The first network device of claim 9, wherein the terminal detector is configured to update a new flow list until whether the detected first flow is a flow of the first terminal is determined.

13. The first network device of claim 8, wherein the controller further comprises a traffic manager that is configured to configure a quality of service (QoS) for at least one terminal connected to the second network device.

14. The first network device of claim 13, wherein the traffic manager is configured to generate a new device identifier (device ID) for the first terminal in case that the first terminal is connected to the second network device, generate a QoS tag according to at least one of whether the detected first flow is a flow of the first terminal or a traffic type of the detected first flow, and update a flow list, a device list, and a QoS rule database based on the device ID and the QoS tag.

15. The first network device of claim 8, further comprising a storage to store information regarding traffic control.

* * * * *